United States Patent
Nakagawa et al.

(10) Patent No.: US 12,053,770 B2
(45) Date of Patent: Aug. 6, 2024

(54) CATION-EXCHANGE MEMBRANE, ELECTROLYZER, AND METHOD FOR PRODUCING CATION-EXCHANGE MEMBRANE

(71) Applicant: ASAHI KASEI KABUSHIKI KAISHA, Tokyo (JP)

(72) Inventors: Kenji Nakagawa, Tokyo (JP); Masatsugu Morishita, Tokyo (JP); Hideaki Kurita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 492 days.

(21) Appl. No.: 17/275,440

(22) PCT Filed: Nov. 6, 2019

(86) PCT No.: PCT/JP2019/043477
§ 371 (c)(1),
(2) Date: Mar. 11, 2021

(87) PCT Pub. No.: WO2020/100684
PCT Pub. Date: May 22, 2020

(65) Prior Publication Data
US 2022/0040684 A1    Feb. 10, 2022

(30) Foreign Application Priority Data

Nov. 12, 2018  (JP) ................................ 2018-212504

(51) Int. Cl.
| | | |
|---|---|---|
| *B01J 47/127* | (2017.01) | |
| *C08J 5/22* | (2006.01) | |
| *C25B 1/46* | (2006.01) | |
| *C25B 9/23* | (2021.01) | |
| *C25B 13/02* | (2006.01) | |
| *C25B 13/08* | (2006.01) | |

(52) U.S. Cl.
CPC ........... *B01J 47/127* (2017.01); *C08J 5/2243* (2013.01); *C25B 1/46* (2013.01); *C25B 9/23* (2021.01); *C25B 13/02* (2013.01); *C25B 13/08* (2013.01)

(58) Field of Classification Search
CPC ........ B01D 71/32; B01D 71/36; B32B 27/322
See application file for complete search history.

(56) References Cited

U.S. PATENT DOCUMENTS

| | | |
|---|---|---|
| 2004/0092611 A1 | 5/2004 | Nishio et al. |
| 2014/0080930 A1 | 3/2014 | Fukunaga et al. |
| 2017/0218526 A1 | 8/2017 | Yamaki et al. |
| 2018/0141035 A1 | 5/2018 | Nakajima et al. |
| 2020/0203746 A1 | 6/2020 | Inoue et al. |

FOREIGN PATENT DOCUMENTS

| | | |
|---|---|---|
| CN | 101020758 | 8/2007 |
| CN | 101768758 A | 7/2010 |
| CN | 102336043 | 2/2012 |
| CN | 103534283 A | 1/2014 |
| JP | H5-098486 | 4/1993 |
| JP | 2000-243135 | 9/2000 |
| JP | 2001-323084 | 11/2001 |
| JP | 2013-163860 | 8/2013 |
| WO | 2002/103083 | 12/2002 |
| WO | 2016/072506 | 5/2016 |
| WO | 2016/186085 | 11/2016 |
| WO | 2018/047925 | 3/2018 |

OTHER PUBLICATIONS

Machine Translation of JP2013-163860A. Aug. 22, 2013. (Year: 2013).*
ISR issued in WIPO Application No. PCT/JP2019/043477, Feb. 4, 2020, English translation.
IPRP issued in WIPO Application No. PCT/JP2019/043477, May 11, 2021, English translation.
Supplementary European Search Report issued in EP Application No. 19885473.9, Nov. 29, 2021.

* cited by examiner

*Primary Examiner* — Stephen E Rieth
(74) *Attorney, Agent, or Firm* — GREENBLUM & BERNSTEIN P.L.C.

(57) ABSTRACT

A cation-exchange membrane includes layer (I) containing repeating units (A) each represented by formula (1) and repeating units (S) each containing a sulfonic acid-type ion-exchange group, wherein the mass proportion of repeating units (A) based on the total mass proportion of repeating units (A) and repeating units (S) being 100% by mass is 53% by mass or more and 70% by mass or less; and layer (II) containing a fluorine-containing polymer containing a carboxylic acid-type ion-exchange group and disposed on layer (I), wherein the water content of layer (I) is 26% or more and 35% or less:

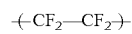

(1)

17 Claims, 2 Drawing Sheets

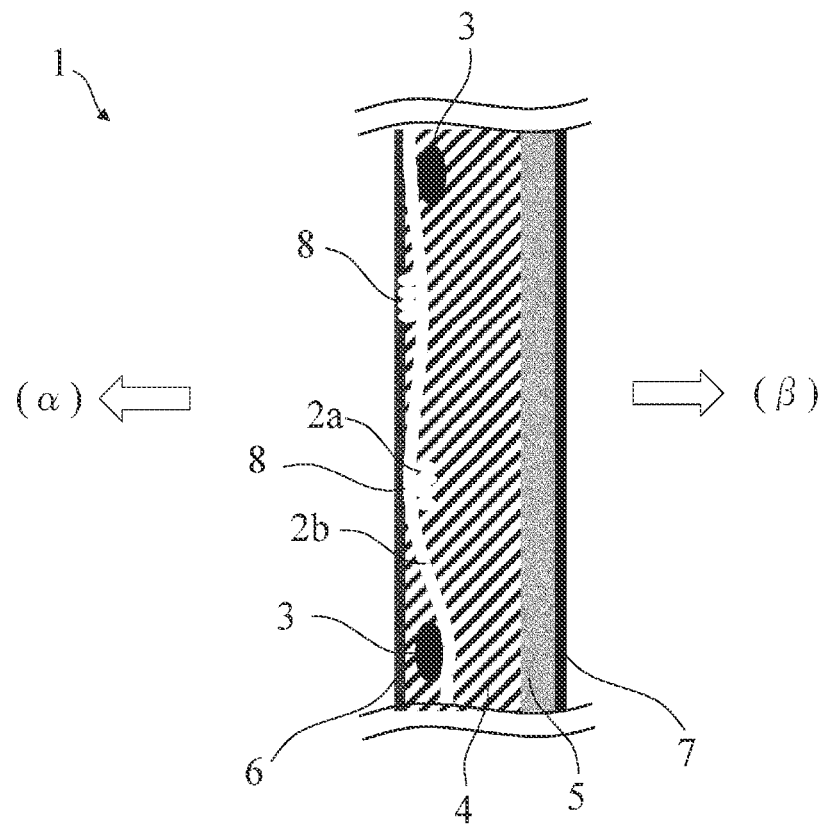
[FIG. 1]
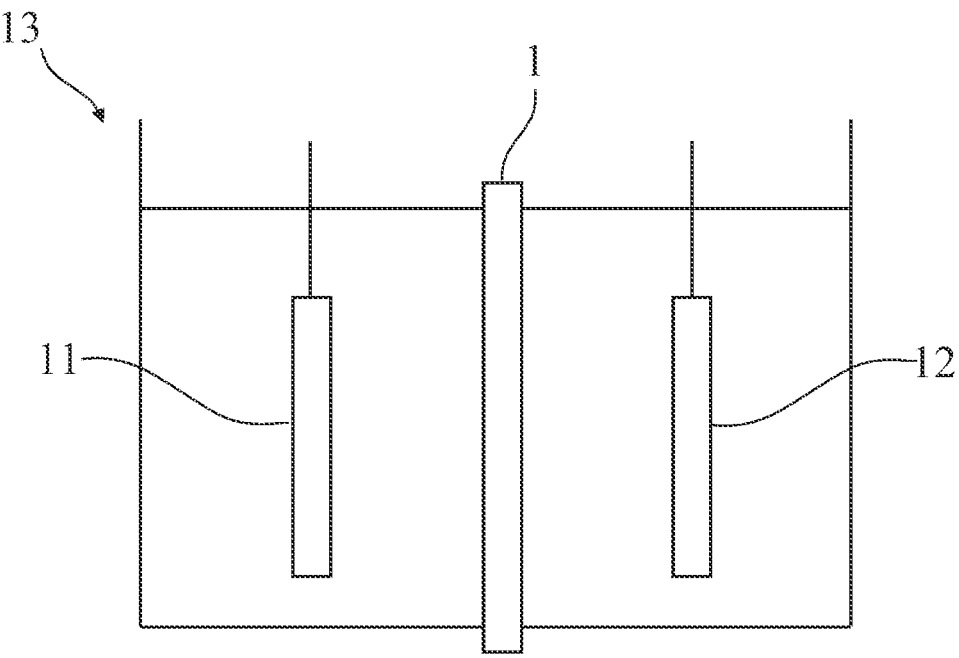
[FIG. 2]

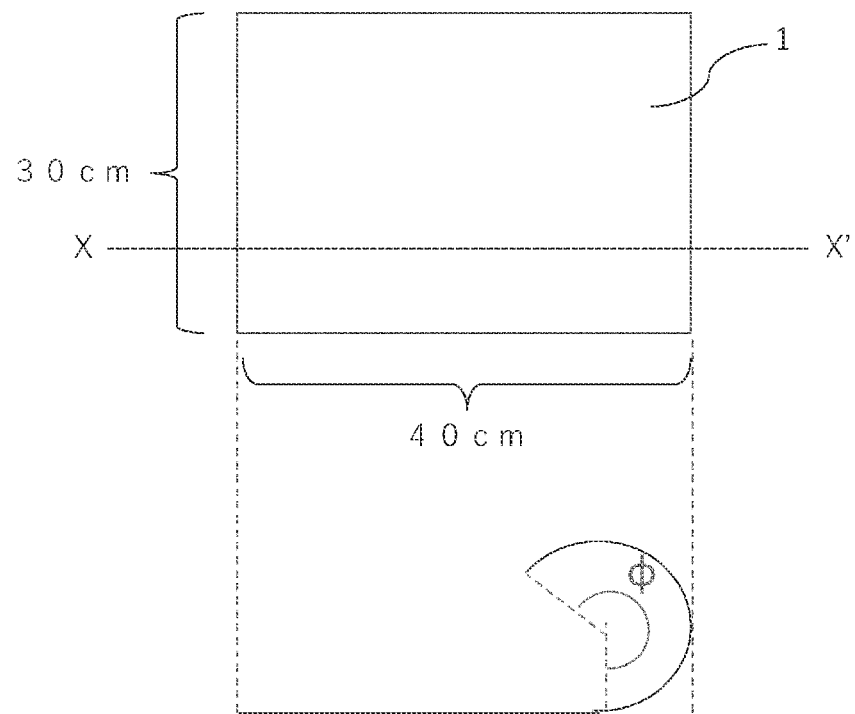
[FIG.3]

CATION-EXCHANGE MEMBRANE, ELECTROLYZER, AND METHOD FOR PRODUCING CATION-EXCHANGE MEMBRANE

TECHNICAL FIELD

The present invention relates to a cation-exchange membrane, an electrolyzer, and a method for producing a cation-exchange membrane.

BACKGROUND ART

Electrochemical apparatuses using an ion-exchange membrane as an electrolyte include alkali metal salt electrolyzers, water electrolyzers, hydrochloric acid electrolyzers, and fuel cells. Examples of electrolysis that is matured as an industrial process and widely used among them include electrolysis using an alkali metal salt electrolyzer. Conventionally well-known are industrial methods to produce halogen gas such as chlorine, caustic alkali, and hydrogen through electrolysis of aqueous solution of an alkali metal salt such as sodium chloride and potassium chloride. Among them, an electrolysis technique based on an ion-exchange membrane method, which uses an ion-exchange membrane for the membrane, has been industrially implemented as the most advantageous process for energy saving with the least power consumption in a global scale.

Even for the electrolysis technique based on the ion-exchange membrane method, however, further reduction of power consumption is currently demanded. The part accounting for the largest part of the power consumption in the ion-exchange membrane method is an ion-exchange membrane as the membrane, and it is critical to reduce the power consumption of ion-exchange membranes.

Ion-exchange membranes typically have a structure in which a layer containing sulfonic acid (sulfonic acid layer) and a layer containing carboxylic acid (carboxylic acid layer) are laminated. Power consumption in the ion-exchange membrane method is determined from electrolysis voltage and current efficiency, where electrolysis voltage is affected by both of the sulfonic acid layer and the carboxylic acid layer, and current efficiency is primarily affected by the carboxylic acid layer. Reduction of power consumption is achieved by high current efficiency and low electrolysis voltage. From such a viewpoint, Patent Literature 1 proposes a solid electrolyte membrane obtained by dissolving one fluorine-containing polymer in another fluorine-containing polymer containing a functional group. Patent Literature 2 proposes that for an ion-exchange membrane consisting of at least two layers of a layer containing carboxylic acid and a layer containing sulfonic acid, the cluster diameter and number of clusters in each layer are controlled.

CITATION LIST

Patent Literature

Patent Literature 1: Japanese Patent Laid-Open No. 2000-243135
Patent Literature 2: Japanese Patent Laid-Open No. 2001-323084

SUMMARY OF INVENTION

Technical Problem

To develop high current efficiency, it is important that the amount of water contained in the carboxylic acid layer is small (low water content). To develop low electrolysis voltage, on the other hand, an approach to increase the number of ion-exchange groups in the sulfonic acid layer is contemplated; however, simple increase of the number of ion-exchange groups, that is, lowering of the equivalent weight (EW) causes increase of the water content to increase difference in water content between the carboxylic acid layer and the sulfonic acid layer, and in addition lowers the ratio of tetrafluoroethylene (TFE) units (TFE ratio) in the polymer constituting the sulfonic acid layer, leading to loss of rigidity to result in a membrane that is likely to curl. The occurrence of curling in a membrane during membrane production, in particular, in a step of hydrolysis, leads to serious problems such as failure in winding of membranes after hydrolysis, poor handleability in handling, and failure in setting membranes in electrolysis. A core material is embedded in the sulfonic acid layer in some cases to reinforce the membrane, and also in this case increasing the water content by lowering the EW disables the core material from conforming to size variation due to the swelling of the sulfonic acid layer, and in addition lower the TFE ratio in the polymer constituting the sulfonic acid layer, leading to loss of rigidity to results in a membrane that is likely to curl.

In particular, Patent Literatures 1 and 2 do not refer to reduction of electrolysis voltage together with suppression of curling.

The present invention was made to solve the above problems, and an object of the present invention is to provide a cation-exchange membrane, an electrolyzer, and a method for producing a cation-exchange membrane that can suppress curling concomitantly with achievement of low electrolysis voltage.

Solution to Problem

The present inventors diligently studied to solve the above problems, and found that the above problems can be solved with a cation-exchange membrane having a specific configuration, completing the present invention.

Specifically, the present invention includes the following:

[1]
A cation-exchange membrane comprising:
a layer (I) comprising repeating units (A) each represented by formula (1) and repeating units (S) each comprising a sulfonic acid-type ion-exchange group, wherein a mass proportion of the repeating units (A) based on a total mass proportion of the repeating units (A) and the repeating units (S) being 100% by mass is 53% by mass or more and 70% by mass or less; and
a layer (II) comprising a fluorine-containing polymer comprising a carboxylic acid-type ion-exchange group and disposed on the layer (I),
wherein a water content of the layer (I) is 26% or more and 35% or less:

(1)

The cation-exchange membrane according to [1], wherein the repeating units (S) comprises repeating units (B) each represented by formula (2):

(2)

wherein, in formula (2), n represents an integer of 0 to 3, m represents an integer of 1 to 12, and M represents an alkali metal.

[3]

The cation-exchange membrane according to [2], wherein the repeating units (B) comprises repeating units (C) each represented by formula (3) and repeating units (D) each represented by formula (4):

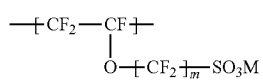

(3)

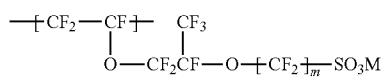

(4)

wherein, in formulas (3) and (4), m and M are as defined in formula (2).

[4]

The cation-exchange membrane according to [3], wherein, based on a total mass proportion of the repeating units (A), the repeating units (C) and the repeating units (D) being 100% by mass in the layer (I), a mass proportion of the repeating units (A) is 53% by mass or more and 70% by mass or less, a mass proportion of the repeating units (C) is 3% by mass or more and 44% by mass or less, and a mass proportion of the repeating units (D) is 3% by mass or more and 44% by mass or less.

[5]

The cation-exchange membrane according to any of [1] to [4], wherein a difference in water content between the layer (I) and the layer (II) is 25% or less.

[6]

The cation-exchange membrane according to any of [1] to [5], further comprising a core material disposed in an inside of the layer (I) or between the layer (I) and the layer (II).

[7]

A cation-exchange membrane comprising:
 a layer (I) comprising repeating units (A) each represented by formula (1) and repeating units (S) each containing a sulfonic acid-type ion-exchange group; and
 a layer (II) comprising a fluorine-containing polymer comprising a carboxylic acid-type ion-exchange group and disposed on the layer (I),
 wherein the repeating units (S) comprises repeating units (C) each represented by formula (3) and repeating units (D) each represented by formula (4), and
 a water content of layer (I) is 25% or more and 35% or less:

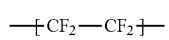

(1)

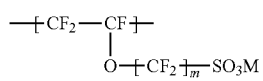

(3)

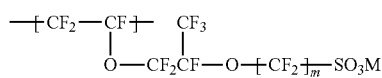

(4)

wherein, in formulas (3) and (4), m each independently represents an integer of 1 to 12, and M represents an alkali metal.

[8]

The cation-exchange membrane according to [7], further comprising a core material disposed in an inside of the layer (I) or between the layer (I) and the layer (II).

[9]

The cation-exchange membrane according to [6] or [8], wherein an elongation of the core material in MD at a load of 30 N is 10 GL % or less.

[10]

The cation-exchange membrane according to any of [6], [8] and [9], wherein an elongation of the core material in TD at a load of 30 N is 10 GL % or less.

[11]

The cation-exchange membrane according to any of [6] and [8] to [10], wherein the core material is a woven fabric of a fiber comprising a fluorine polymer.

[12]

The cation-exchange membrane according to any of [1] to [11], wherein a total ion-exchange capacity of the layer (I) is 1.0 mg eq./g or more and 1.5 mg eq./g or less.

[13]

The cation-exchange membrane according to any of [3] to [12], wherein the layer (I) comprises a mixture of a copolymer comprising the repeating units (A) and the repeating units (C) and a copolymer comprising the repeating units (A) and the repeating units (D).

[14]

The cation-exchange membrane according to any of [3] to [13], wherein the layer (I) comprises a copolymer comprising the repeating units (A), the repeating units (C), and the repeating units (D).

[15]

The cation-exchange membrane according to any of [1] to [14], wherein a value obtained by dividing an equivalent weight of the layer (I) by an equivalent weight of the layer (II) is 0.6 or more and 0.8 or less.

[16]

The cation-exchange membrane according to any of [1] to [15], wherein, in layer (I), a value obtained by dividing the water content by the mass proportion of the repeating units (A) based on the total mass proportion of the repeating units (A) and the repeating units (S) being 100% by mass is 0.48 or more and 0.64 or less.

[17]

The cation-exchange membrane according to any of [6] to [16], comprising a laminate structure consisting of the layer (I) and the layer (II),
 wherein the core material is disposed in an inside of the layer (I).

[18]

The cation-exchange membrane according to any of [3] to [16], wherein the layer (I) has a laminate structure consisting of: a layer (I-1) comprising a copolymer comprising the repeating units (A) and the repeating units (D); and a layer different from the layer (I-1).

[19]

The cation-exchange membrane according to any of [3] to [16], wherein the layer (I) has a laminate structure consisting of: a layer (I-2) comprising a copolymer comprising the repeating units (A) and the repeating units (C); and a layer different from the layer (I-2).

[20]

The cation-exchange membrane according to any of [6] to [16], wherein the layer (I) has a laminate structure including:

layer (I-3) being an outermost layer of the cation-exchange membrane and including the core material; and a layer different from the layer (I-3).

[21]

The cation-exchange membrane according to any of [3] to [16], wherein the layer (I) has a laminate structure comprising: a layer (I-1) comprising a copolymer comprising the repeating units (A) and the repeating units (D); layer (I-2) comprising a copolymer comprising the repeating units (A) and the repeating units (C); and a layer different from the layer (I-1) and the layer (I-2).

[22]

The cation-exchange membrane according to any of [1] to [21], wherein the fluorine-containing polymer comprising the carboxylic acid-type ion-exchange group comprises:
the repeating units (A) and
repeating units (E) each represented by formula (5):

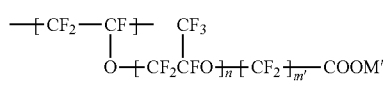

(5)

wherein, in formula (5), n represents an integer of 0 or 1, m' represents an integer of 1 to 12, and M' represents an alkali metal.

[23]

The cation-exchange membrane according to any of [1] to [22], to be used for chloro-alkali electrolysis.

[24]

An electrolyzer comprising:
an anode;
a cathode; and
the cation-exchange membrane according to any of [1] to [23] disposed between the anode and the cathode.

[25]

The electrolyzer according to [24], wherein the layer (II) is disposed to face the cathode.

[26]

A method for producing the cation-exchange membrane according to any of [7] to [23], the method comprising:
producing a fluorine-containing polymer;
obtaining a core material;
forming the fluorine-containing polymer into a film;
embedding the core material and the film to form a composite membrane; and
hydrolyzing the composite membrane with an acid or an alkali.

Advantageous Effects of Invention

The present invention can provide a cation-exchange membrane, an electrolyzer, and a method for producing a cation-exchange membrane that can suppress curling concomitantly with achievement of low electrolysis voltage.

BRIEF DESCRIPTION OF DRAWINGS

FIG. 1 shows a schematic cross-sectional view of an example of the cation-exchange membrane of the present embodiment.

FIG. 2 shows a schematic diagram of an example of the electrolyzer of the present embodiment.

FIG. 3 shows an explanatory drawing to exemplify a method for evaluating curling of cation-exchange membranes.

DESCRIPTION OF EMBODIMENTS

Hereinafter, embodiments to implement the present invention (hereinafter, referred to as "the present embodiment") will be described in detail. The present invention is not limited to the present embodiment in the following, and can be implemented with various modifications within the gist.

[Cation-Exchange Membrane]

A cation-exchange membrane according to one aspect of the present embodiment (hereinafter, also referred to as "the first cation-exchange membrane") includes: layer (I) containing repeating units (A) each represented by formula (1) and repeating units (S) each containing a sulfonic acid-type ion-exchange group, wherein the mass proportion of repeating units (A) based on the total mass proportion of repeating units (A) and repeating units (S) of 100% by mass is 53% by mass or more and 70% by mass or less; and layer (II) containing a fluorine-containing polymer containing a carboxylic acid-type ion-exchange group and disposed on layer (I), wherein the water content of layer (I) is 26% or more and 35% or less:

(1)

Because of the configuration as described above, the first cation-exchange membrane can suppress curling concomitantly with achievement of low electrolysis voltage, and use of the cation-exchange membrane for electrolyzers can prevent failure in membrane installation and generation of pinholes due to trouble in handling membranes, concomitantly with achievement of reduction of power consumption in electrolysis.

A cation-exchange membrane according to another aspect of the present embodiment (hereinafter, also referred to as "the second cation-exchange membrane") includes: layer (I) containing repeating units (A) each represented by formula (1) and repeating units (S) each containing a sulfonic acid-type ion-exchange group; and layer (II) containing a fluorine-containing polymer containing a carboxylic acid-type ion-exchange group and disposed on layer (I), wherein repeating units (S) include repeating units (C) each represented by formula (3) and repeating units (D) each represented by formula (4), and the water content of layer (I) is 25% or more and 35% or less:

(1)

(3)

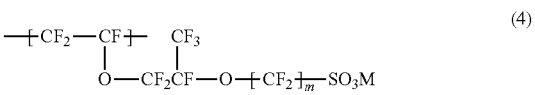

(4)

wherein, in formulas (3) and (4), m each independently represents an integer of 1 to 12, and M represents an alkali metal.

Because of the configuration as described above, the second cation-exchange membrane can suppress curling concomitantly with achievement of low electrolysis voltage, and use of the cation-exchange membrane for electrolyzers can prevent failure in membrane installation and generation of pinholes due to trouble in handling membranes, concomitantly with achievement of reduction of power consumption in electrolysis.

As described above, according to the present embodiment, both of the first cation-exchange membrane and the second cation-exchange membrane can suppress curling concomitantly with achievement of low electrolysis voltage, and hence electrolyzers that can more contribute to energy saving than conventional ones can be provided through application of them to members of electrolyzers. Hereinafter, the present embodiment is described with the assumption that the phrase "the cation-exchange membrane of the present embodiment" encompasses "the first cation-exchange membrane" and "the second cation-exchange membrane".

Hereinafter, a mechanism of action expected in the present embodiment will be described; however, it is not intended to limit to the following mechanism of action.

First, a laminate membrane in which a layer containing carboxylic acid (carboxylic acid layer) and a layer containing sulfonic acid (sulfonic acid layer) are laminated (cation-exchange membrane) can be primarily used as a chloroalkali electrolysis membrane with the ion-exchange membrane method. The sulfonic acid layer in the laminate membrane primarily serves as a support layer, and the carboxylic acid layer contributes to development of high current efficiency. The carboxylic acid layer is characterized by having narrow clusters as paths for ions, and interaction between ions and ion-exchange groups present on wall surfaces of clusters allows only desired ions to pass therethrough. Thereby, selectivity, that is, current efficiency is developed. Because clusters are formed from ion-exchange groups and water, the carboxylic acid layer having narrow clusters tends to have a low water content.

To achieve low resistance, on the other hand, the sulfonic acid layer is composed of a polymer having a water content as high as possible to enlarge cluster diameters. As a method of increasing the water content, increase of the number of ion-exchange groups, that is, lowering of the EW is contemplated. However, increase of the water content by simply lowering the EW increases difference in water content between the carboxylic acid layer and the sulfonic acid layer, and in addition lowers the TFE ratio in the polymer constituting the sulfonic acid layer, leading to loss of rigidity to result in a membrane that is likely to curl. Accordingly, ion-exchange membranes that achieve low electrolysis voltage and suppression of curling in combination have not been developed yet.

In view of this, in designing a cation-exchange membrane in the present embodiment, low electrolysis voltage and suppression of curling were achieved in combination by allowing the fluorine-containing polymer constituting the sulfonic acid layer to include at least two types of specific repeating units and adjusting the TFE ratio and water content in the sulfonic acid layer within specific ranges (the first cation-exchange membrane), or in setting the water content of the sulfonic acid layer in a wider range, by allowing the fluorine-containing polymer constituting the sulfonic acid layer to include at least three types of specific repeating units (the second cation-exchange membrane).

[Fluorine-Containing Polymer]

The cation-exchange membrane of the present embodiment includes specific layer (I) and layer (II), and it can be said that each layer is a layer containing a specific fluorine-containing polymer.

"Fluorine-containing polymer" in the present embodiment refers to a fluorine-containing polymer containing an ion-exchange group or an ion-exchange group precursor that can become an ion-exchange group through hydrolysis. In the present embodiment, "ion-exchange group" refers to a sulfonic acid-type ion-exchange group/carboxylic acid-type ion-exchange group. In the case that the fluorine-containing polymer contains an ion-exchange group precursor that can become an ion-exchange group through hydrolysis (e.g., a carboxylic acid group precursor and a sulfonic acid group precursor), the carboxylic acid group precursor is converted into a carboxylic acid-type ion-exchange group and the sulfonic acid group precursor is converted into a sulfonic acid-type ion-exchange group after membrane formation with a method described later. For example, conversion into ion-exchange groups is achieved through hydrolysis of a polymer or the like that includes a main chain of fluorinated hydrocarbon with a functional group, as a pendant side chain, that can be converted into an ion-exchange group through hydrolysis or the like, and that can be subjected to melt-processing.

The fluorine-containing polymer in the cation-exchange membrane of the present embodiment has undergone hydrolysis, and hence includes a sulfonic acid-type ion-exchange group/carboxylic acid-type ion-exchange group.

The fluorine-containing polymer containing a sulfonic acid-type ion-exchange group/carboxylic acid-type ion-exchange group as an ion-exchange group has a structure, for example, in which a hydrophobic polymer main chain moiety and hydrophilic carboxylic acid group or sulfonic acid group moieties are microscopically separated. As a result, the fluorine-containing polymer contains, for example, an ion cluster including sulfonic acid groups or carboxylic acid groups gathering together.

To develop chemical resistance, each of repeating units (S) in the first cation-exchange membrane preferably has a perfluoro structure, and repeating units (S) preferably include repeating units (B) each represented by formula (2), which include an exchange group in a flexible side chain, in order to form clusters serving as pass lines for ions through phase separation:

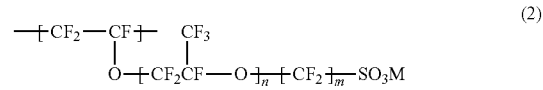

wherein, in formula (2), n represents an integer of 0 to 3, m represents an integer of 1 to 12, and M represents an alkali metal.

To achieve lower voltage and more reliably suppress curling, repeating units (B) in the first cation-exchange membrane preferably include repeating units (C) each represented by formula (3) and repeating units (D) each represented by formula (4) to adjust the TFE ratio and water content within specific ranges:

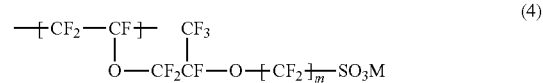

wherein, in formulas (3) and (4), m and M are as defined in formula (2).

Layer (I) in the first cation-exchange membrane is needed to include repeating units (A) and (S) in the whole layer.

That is, layer (I) may contain a mixture of a fluorine-containing polymer containing repeating units (A) and a fluorine-containing polymer containing repeating units (S), or contain a fluorine-containing polymer containing repeating units (A) and (S).

In the case that layer (I) in the first cation-exchange membrane contains repeating units (A) and repeating units (B), for example, layer (I) may contain a mixture of a fluorine-containing polymer containing repeating units (A) and a fluorine-containing polymer containing repeating units (B), or contain a fluorine-containing polymer containing repeating units (A) and (B).

In the case that layer (I) in the first cation-exchange membrane contains repeating units (A) and repeating units (C) and (D), layer (I) may contain a mixture of a fluorine-containing polymer containing repeating units (A), a fluorine-containing polymer containing repeating units (C), and a fluorine-containing polymer containing repeating units (D), or contain a fluorine-containing polymer containing repeating units (A), (C), and (D).

Layer (I) in the second cation-exchange membrane is needed to include repeating units (A), (C), and (D) in the whole layer. That is, layer (I) may contain a mixture of a fluorine-containing polymer containing repeating units (A), a fluorine-containing polymer containing repeating units (C), and a fluorine-containing polymer containing repeating units (D), or contain a fluorine-containing polymer containing repeating units (A), (C), and (D).

Layer (I) in the cation-exchange membrane of the present embodiment may include one type of repeating units singly, or include two or more types of repeating units, as repeating units corresponding to repeating units (S), (B), (C), or (D). For repeating units (B), for example, layer (I) may include two or more types of repeating units with structures differing only in the value(s) of n and/or m in formula (2). Layer (I) in the cation-exchange membrane of the present embodiment may include units other than repeating units (A), (S), (B), (C), and (D).

In view of use for chloro-alkali electrolysis, layer (I) in the cation-exchange membrane of the present embodiment is preferably such that M in repeating units (S), (B), (C), and (D) is Na, but M is not limited thereto. With M being Na, for example, a significantly reduced water content is provided as a tendency as compared with the case that M is H, and sufficient strength for preventing the rupture of the membrane due to electrolysis operations can be ensured as a tendency. In view of the same use, it is preferable that m in repeating units (S), (B), (C), and (D) be 4 or less. With m being 4 or less, for example, a higher TFE ratio in a fluorine-containing polymer is provided as a tendency, and sufficient rigidity for preventing the curling of the membrane is ensured as a tendency.

Layer (II) in the cation-exchange membrane of the present embodiment contains a fluorine-containing polymer containing a carboxylic acid-type ion-exchange group. The fluorine-containing polymer constituting layer (II) is not limited, but from the viewpoint of ion selectivity, layer (II) preferably contains a fluorine-containing polymer containing repeating units (A) and repeating units (E) each represented by formula (5):

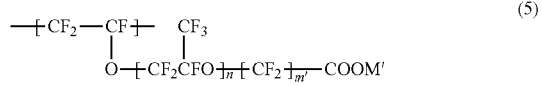
(5)

wherein, in formula (5), n represents an integer of 0 or 1, m' represents an integer of 1 to 12, and M' represents an alkali metal.

In the present embodiment, it is preferable in using for chloro-alkali electrolysis that M' in repeating units (E) be Na, but M' is not limited thereto. With M' being Na, for example, a significantly increased water content is provided as a tendency as compared with the case that M' is H, and the electrolysis voltage of the membrane through electrolysis operations can be significantly lowered as a tendency.

In the present embodiment, it is preferable in using for chloro-alkali electrolysis that m' in repeating units (E) be 4 or less, but m' is not limited thereto. With m' being 4 or less, for example, a higher TFE ratio in a fluorine-containing polymer is provided as a tendency, and sufficient strength for preventing the rupture of the membrane due to electrolysis operations can be ensured as a tendency.

Layer (II) in the cation-exchange membrane of the present embodiment may include one type of repeating units singly, or include two or more types of repeating units, as repeating units corresponding to repeating units (E). That is, layer (II) may include two or more types of repeating units with structures differing only in the value(s) of n and/or m' in formula (4). Layer (II) in the cation-exchange membrane of the present embodiment may include units other than repeating units (A) and (E).

The fluorine-containing polymer constituting layer (I) can be produced, for example, by using any of the following methods.

Method 1: a method in which a copolymer of general formula (A1) and general formula (C1) and a copolymer of general formula (A1) and general formula (D1) are separately prepared and the copolymers are blended to produce a polymer mixture.

Method 2: a method in which a copolymer of general formula (A1), general formula (C1), and general formula (D1) is produced.

(A1)

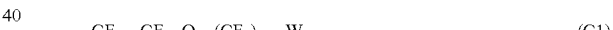
(C1)

In general formula (C1), m is an integer of 1 to 12, and W is a precursor moiety that is hydrolyzed in an alkaline medium to become a sulfonic acid group and selected from the halogenated sulfonyl group —$SO_2X$ (X is selected from —F, —Cl, and —Br) and the alkylsulfone group —$SO_2R$ (R is a lower alkyl group having one to four carbon atoms).

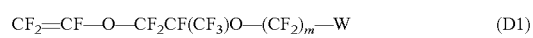
(D1)

In general formula (D1), m is an integer of 1 to 12, and W is a precursor moiety that is hydrolyzed in an alkaline medium to become a sulfonic acid group and selected from the halogenated sulfonyl group —$SO_2X$ (X is selected from —F, —Cl, and —Br) and the alkylsulfone group —$SO_2R$ (R is a lower alkyl group having one to four carbon atoms).

Here, general formula (A1) represents a monomer corresponding to repeating units (A), general formula (C1) represents a monomer corresponding to repeating units (C), and general formula (D1) represents a monomer corresponding to repeating units (D).

The fluorine-containing polymer obtained with method 1 is a mixture (polymer blend) of copolymer (AC) containing repeating units (A) and (C) and copolymer (AD) containing repeating units (A) and (D). That is, layer (I) in the cation-exchange membrane of the present embodiment can contain a mixture of copolymer (AC) containing repeating units (A) and repeating units (C) and copolymer (AD) containing repeating units (A) and repeating units (D). The fluorine-containing polymer obtained with method 2 is a copolymer containing repeating units (A), (C), and (D). That is, layer (I) in the cation-exchange membrane of the present embodiment may contain a copolymer containing repeating units (A), repeating units (C), and repeating units (D). If the composition of the fluorine-containing polymer is controlled to a desired composition in the present embodiment, though the situation is not limited thereto, use of the above-described polymer blend is simpler and technically easier than use of a copolymer containing repeating units (A), (C), and (D), and superior supply stability for the fluorine-containing polymer is provided as a tendency.

In any of method 1 and method 2, a monomer other than the above monomers may be used as a copolymer component.

Alternatively, a copolymer obtained with method 2 can be used in combination with polymer (AC) and/or polymer (AD) in method 1 to form layer (I).

It is preferred to use, for example, a vinyl fluoride compound represented by general formula (A2) as a copolymer component of the fluorine-containing polymer constituting layer (I):

$$CF_2=CX_1X_2 \tag{A2}$$

wherein $X_1$, $X_2$=—F, —Cl, —H, or —$CF_3$.

Examples of the vinyl fluoride compound represented by general formula (A2) include, but are not limited to, vinyl fluoride, hexafluoropropylene, vinylidene fluoride, trifluoroethylene, chlorotrifluoroethylene, and perfluoro(alkyl vinyl ether). In using the cation-exchange membrane according to the present embodiment for a strongly alkaline electrolyte solution for chloro-alkali electrolysis or the like, it is preferable that the vinyl fluoride compound be a perfluoro monomer, and a perfluoro monomer selected from the group consisting of hexafluoropropylene and perfluoro(alkyl vinyl ether) is more preferred.

As specific examples of general formula (C1), the following monomers are preferred.

$$CF_2=CFOCF_2CF_2SO_2F$$

$$CF_2=CFOCF_2CF_2CF_2SO_2F$$

$$CF_2=CFOCF_2CF_2CF_2CF_2SO_2F$$

As specific examples of general formula (D1), the following monomers are preferred.

$$CF_2=CFOCF_2CF(CF_3)O-CF_2CF_2SO_2F$$

$$CF_2=CFOCF_2CF(CF_3)O-CF_2CF_2CF_2SO_2F$$

$$CF_2=CFOCF_2CF(CF_3)O-CF_2CF_2CF_2CF_2SO_2F$$

A polymer or copolymer derived from any of the above monomers can be produced with a polymerization process developed for homopolymerization and copolymerization of ethylene fluoride, in particular, with a common polymerization method used for tetrafluoroethylene.

In a non-aqueous process, for example, polymerization reaction can be performed by using an inert solvent such as perfluorohydrocarbon and chlorofluorocarbon in the presence of a radical polymerization initiator such as perfluorocarbon peroxide and an azo compound under conditions of a temperature of 0 to 200° C. and a pressure of 0.1 to 20 MPa. The copolymer may be a block copolymer or random copolymer.

[Blending]

Methods for blending fluoropolymers can be performed in accordance with any of various known techniques relating to blending and kneading, and applicable methods are not limited and, for example, a single-screw kneading extruder, a twin-screw kneading extruder, a LABO PLASTOMILL, and a mixer with pellets of fluorine-containing polymers. The temperature in blending is preferably a temperature at which fluorine-containing polymers melt or higher, and preferably a temperature that does not cause the pyrolysis of fluorine-containing polymers or lower. Specifically, the temperature in blending is preferably 230° C. or higher and 270° C. or lower. The blending time is preferably 1 minute or longer and 60 minutes or shorter if a batch kneader such as a LABO PLASTOMILL and a mixer is used. The blending time is preferably 1 minute or longer as a period of time required for sufficient heat conduction after loading polymers into an apparatus, and preferably 60 minutes or shorter to prevent thermal degradation due to long-time blending.

The fluoropolymer including a carboxylic acid group and constituting layer (II) in the cation-exchange membrane of the present embodiment can be produced by copolymerizing a monomer of a first group and a monomer of a second group below, or by homopolymerizing a monomer of the second group.

Examples of monomers of the first group include the above-described vinyl fluoride compound. In the case that the cation-exchange membrane of the present embodiment is used for a strongly alkaline electrolyte solution for chloro-alkali electrolysis or the like, the vinyl fluoride compound is preferably a perfluoro monomer, and more preferably a perfluoro monomer selected from the group consisting of tetrafluoroethylene, hexafluoropropylene, and perfluoro(alkyl vinyl ether). Even more preferred is tetrafluoroethylene (TFE).

Examples of monomers of the second group include vinyl compounds having a functional group that can be converted into a carboxylic acid-type ion-exchange group.

Vinyl compounds represented by general formula (E1) are preferred as vinyl compounds having a functional group that can be converted into a carboxylic acid-type ion-exchange group:

$$CF_2=CF-O-(CF_2CF(CF_3)O)_n-(CZF)_{m'}-X \tag{E1}$$

in general formula (E1), n represents an integer of 0 or 1, m' represents an integer of 1 to 12, Z represents F or $CF_3$, X is a precursor that is hydrolyzed in an alkaline medium to become a carboxylic acid group and selected from the carboxylate group —COOR (R: a lower alkyl group having one to four carbon atoms), the cyano group —CN, and the acid halide —COQ (Q: a halogen atom).

More preferred are vinyl compounds, represented by general formula (E2), having a functional group that can be converted into a carboxylic acid-type ion-exchange group:

$$CF_2=CF-O-(CF_2CF(CF_3)O)_n-(CF_2)_mCOOR \tag{E2}$$

in general formula (E2), n represents an integer of 0 or 1, m' represents an integer of 1 to 4, and R represents $CH_3$, $C_2H_5$, or $C_3H_7$.

In general formula (D2), it is preferable that R be $CH_3$. In particular, in the case that the cation-exchange membrane of the present embodiment is used as a cation-exchange membrane for alkaline electrolysis, it is preferred to at least use a perfluoro monomer as a monomer of the second group; however, the alkyl group of the ester group (see R in the above) is removed from the polymer at the time of being hydrolyzed, and hence the alkyl group (R) does not need to be a perfluoroalkyl group in which all the hydrogen atoms are substituted with fluorine atoms. Among such monomers, for example, the following monomers are more preferred.

$CF_2=CFOCF_2CF(CF_3)OCF_2COOCH_3$

$CF_2=CFOCF_2CF(CF_3)O(CF_2)_2COOCH_3$

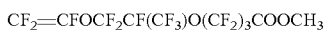

$CF_2=CFOCF_2CF(CF_3)O(CF_2)_3COOCH_3$

$CF_2=CFO(CF_2)_2COOCH_3$

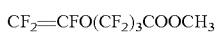

$CF_2=CFO(CF_2)_3COOCH_3$

[Total Ion-Exchange Capacity]

The total ion-exchange capacity measured for layer (I) in the cation-exchange membrane of the present embodiment is preferably 1.0 mg eq./g or more and 1.5 mg eq./g or less, and more preferably 1.1 mg eq./g or more and 1.4 mg eq./g or less. If the total ion-exchange capacity is 1.0 mg eq./g or more, the cation-exchange membrane tends to have enhanced handleability concomitantly with flexibility. If the total ion-exchange capacity is 1.5 mg eq./g or less, the water content of the polymer is not excessively high as a tendency, and it is easier to suppress curling. If the total ion-exchange capacity is 1.1 mg eq./g or more, a lower AC resistance can be imparted to the cation-exchange membrane, and it follows that electrolysis can be performed at a lower voltage as a tendency. If the total ion-exchange capacity is 1.4 mg eq./g or less, sufficient strength and superior handleability are imparted as a tendency.

In the present embodiment, "total ion-exchange capacity" refers to the equivalent of exchange groups per unit weight of a dry resin, and "total ion-exchange capacity" can be measured through neutralization titration, IR, and so on. Specifically, "total ion-exchange capacity" can be measured through a method described later in Examples. The total ion-exchange capacity can be adjusted within the above ranges by appropriately modifying the types and ratios of repeating units in the fluorine-containing polymer.

[EW]

The EW measured for layer (I) in the cation-exchange membrane of the present embodiment is the equivalent weight of the fluoropolymer [g-copolymer composition/eq.-functional groups] (unit: g/eq.), and refers to a unit weight equivalent (g) of a dry resin per 1 mol of ion-exchange groups, and is represented by the following expression with "total ion-exchange capacity" measured, for example, through neutralization titration.

$EW=1/\text{"total ion-exchange capacity"} \times 1000$

The EW measured for layer (I) in the cation-exchange membrane of the present embodiment is preferably 667 g/eq. or more and 1000 g/eq. or less, and more preferably 714 g/eq. or more and 909 g/eq. or less. If the EW is 667 g/eq. or more, the water content of the polymer is not excessively high as a tendency, and it is easier to suppress curling. If the EW is 1000 g/eq. or less, the cation-exchange membrane tends to have enhanced handleability concomitantly with flexibility. If the EW is 714 g/eq. or more, sufficient strength and superior handleability are imparted as a tendency. If the EW is 909 g/eq. or less, a lower AC resistance can be imparted to the cation-exchange membrane, and it follows that electrolysis can be performed at a lower voltage as a tendency.

[TFE Ratio]

"TFE ratio" in the cation-exchange membrane of the present embodiment is the mass proportion of repeating units (A) based on the total mass proportion of repeating units (A) and repeating units (S) of 100% by mass, and calculated through a method described later. In other words, the TFE ratio is the fraction of repeating units (A): —$(CF_2CF_2)$— in the above fluorine-containing polymer. Repeating units (A) in the fluorine-containing polymer is a component that is easily crystallized and crystallized repeating units (A) tend to affect development of strength and suppression of curling, and hence it is preferred to adjust the TFE ratio within an appropriate range.

The TFE ratio measured for layer (I) in the first cation-exchange membrane is in the range of 53% by mass or more and 70% by mass or less, and preferably in the range of 54% by mass or more and 60% by mass or less. If the TFE ratio is 53% by mass or more, sufficient strength that makes the membrane resistant to rupture can be ensured. If the TFE ratio is 70% or less, a lower AC resistance can be imparted to the cation-exchange membrane, and it follows that electrolysis can be performed at a lower voltage. If the TFE ratio is 54% by mass or more, the curling of the cation-exchange membrane is can be suppressed in a more effective manner as a tendency, and if the TFE ratio is 60% by mass or less, the cation-exchange membrane tends to have superior handleability concomitantly with flexibility.

The TFE ratio measured for layer (I) in the second cation-exchange membrane is not limited, but preferably in the range of 53% by mass or more and 70% by mass or less, and more preferably in the range of 54% by mass or more and 60% by mass or less. If the TFE ratio is 53% by mass or more, sufficient strength that makes the membrane resistant to rupture can be ensured as a tendency. If the TFE ratio is 70% or less, a lower AC resistance can be imparted to the cation-exchange membrane, and it follows that electrolysis can be performed at a lower voltage as a tendency. If the TFE ratio is 54% by mass or more, the curling of the cation-exchange membrane can be suppressed as a tendency, and if the TFE ratio is 60% by mass or less, the cation-exchange membrane tends to have superior handleability concomitantly with flexibility.

The TFE ratio measured for layer (II) in the cation-exchange membrane of the present embodiment is not limited, but preferably in the range of 61.5% by mass or more and 65% by mass or less, and more preferably in the range of 62.5% by mass or more and 64.5% by mass or less. If the TFE ratio is 61.5% by mass or more, sufficient strength that makes the membrane resistant to rupture can be ensured as a tendency. If the TFE ratio is 65% by mass or less, the cation-exchange membrane tends to have superior handleability concomitantly with flexibility. If the TFE ratio is 62.5% by mass or more, sufficient current efficiency can be developed, and if the TFE ratio is 64.5% by mass or less, a lower AC resistance can be imparted to the cation-exchange membrane, and it follows that electrolysis can be performed at a lower voltage as a tendency.

The TFE ratio in layer (I) and that in layer (II) can be measured on the basis of a method described later in Examples.

[Polymer Composition Ratio]

(Polymer Composition Ratio in First Cation-Exchange Membrane)

The mass proportion of repeating units (A) based on the total mass proportion of repeating units (A) and repeating units (S) of 100% by mass in layer (I) in the first cation-exchange membrane is 53% by mass or more and 70% by mass or less, and in the case that repeating units (S) include repeating units (C) and repeating units (D) each represented by formula (4), the mass proportions of repeating units (A), (C), and (D) are preferably in ranges below. Composition ratios in the following are ratios when the total mass proportion of (A), (C), and (D) is assumed as 100% by mass.

The composition ratio of repeating units (A), A1, is preferably in the range of 53% by mass or more and 70% by mass or less, and more preferably in the range of 54% by mass or more and 60% by mass or less.

The composition ratio of repeating units (C), C1, is preferably in the range of 3% by mass or more and 44% by mass or less, and more preferably in the range of 5% by mass or more and 41% by mass or less.

The composition ratio of repeating units (D), D1, is preferably in the range of 3% by mass or more and 44% by mass or less, and more preferably in the range of 5% by mass or more and 41% by mass or less.

(Polymer Composition Ratio in Second Cation-Exchange Membrane)

The mass proportions of repeating units (A), (C), and (D) in layer (I) in the second cation-exchange membrane are preferably in ranges below. Composition ratios in the following are ratios when the total mass proportion of (A), (C), and (D) is assumed as 100% by mass.

The composition ratio of repeating units (A), A2, is preferably in the range of 53% by mass or more and 70% by mass or less, and more preferably in the range of 54% by mass or more and 60% by mass or less.

The composition ratio of repeating units (C), C2, is in the range of 3% by mass or more and 44% by mass or less, and more preferably in the range of 5% by mass or more and 41% by mass or less.

The composition ratio of repeating units (D), D2, is preferably in the range of 3% by mass or more and 44% by mass or less, and more preferably in the range of 5% by mass or more and 41% by mass or less.

If the composition ratio of repeating units (A), A1 and A2, in the cation-exchange membrane of the present embodiment is 53% by mass or more, for example, sufficient strength that makes the membrane resistant to rupture can be ensured as a tendency. If the composition ratio of repeating units (A), A1 and A2, is 70% by mass or less, a lower AC resistance can be imparted to the cation-exchange membrane, and it follows that electrolysis can be performed at a lower voltage as a tendency. If the composition ratio of repeating units (A), A1 and A2, is 54% by mass or more, the curling of the cation-exchange membrane can be suppressed as a tendency, and if the composition ratio of repeating units (A), A1 and A2, is 60% by mass or less, the cation-exchange membrane tends to have superior handleability concomitantly with flexibility.

If the composition ratio of repeating units (C), C1 and C2, is 3% by mass or more, curling can be suppressed as a tendency, and if the composition ratio of repeating units (C), C1 and C2, is 44% by mass or less, a lower AC resistance can be imparted to the cation-exchange membrane, and it follows that electrolysis can be performed at a lower voltage as a tendency. If the composition ratio, C1 and C2, is 5% by mass or more, sufficient strength that makes the membrane resistant to rupture can be ensured as a tendency, and if the composition ratio, C1 and C2, is 41% by mass or less, the membrane is less likely to undergo interlayer delamination.

If the composition ratio of repeating units (D), D1 and D2, is 3% by mass or more, a lower AC resistance can be imparted to the cation-exchange membrane, and it follows that electrolysis can be performed at a lower voltage as a tendency, and if the composition ratio of repeating units (D), D1 and D2, is 44% by mass or less, curling can be suppressed as a tendency. If the composition ratio, D1 and D2, is 5% by mass or more, the cation-exchange membrane tends to have superior handleability concomitantly with flexibility, and if the composition ratio, D1 and D2, is 41% by mass or less, sufficient strength that makes the membrane resistant to rupture can be ensured as a tendency.

Control of multiple types of repeating units included in the fluorine-containing polymer containing a sulfonic acid group and the mass proportions of the repeating units can be performed with method 1 or method 2 exemplified above.

In the present embodiment, a polymer containing repeating units each being sulfonic acid including a long side chain with a low resistance but with a low TFE ratio and repeating units each being sulfonic acid including a short side chain with a high resistance but with a high TFE ratio in a well-balanced manner is obtained as a tendency through adjustment of the mass proportions of repeating units as described above, and as a result the balance between low electrolysis voltage and suppression of curling is enhanced as a tendency.

In the case that units other than repeating units (A) to (D) (additional units a) are included in layer (I) in the cation-exchange membrane of the present embodiment, it is preferable for ensuring desired effects of the present embodiment that the content of additional units a be 30% by mass or less as the total of units constituting layer (I) is assumed as 100% by mass, but the content is not limited thereto. With the content being 30% by mass or less, it becomes easier to control the TFE ratio and water content within desired ranges.

In the case that units other than repeating units (A) and (E) (additional units b) are included in layer (II) in the cation-exchange membrane of the present embodiment, it is preferable for ensuring desired effects of the present embodiment that the content of additional units b be 30% by mass or less as the total of units constituting layer (II) is assumed as 100% by mass, but the content is not limited thereto. With the content being 30% by mass or less, it becomes easier to control the TFE ratio and water content within desired ranges.

The ratio of repeating units (D) that is measured for layer (II) in the cation-exchange membrane of the present embodiment and represented by repeating units (E)/(repeating units (A)+repeating units (E)) is preferably in the range of 35% by mass or more and 38.5% by mass or less, and more preferably in the range of 35.5% by mass or more and 37.5% by mass or less, but the ratio is not limited thereto. If the ratio is 35% by mass or more, the cation-exchange membrane tends to have superior handleability concomitantly with flexibility. If the ratio is 38.5% by mass or less, sufficient strength that makes the membrane resistant to rupture can be ensured as a tendency. If the ratio is 35.5% by mass or more, a lower AC resistance can be imparted to the cation-exchange membrane, and it follows that electrolysis can be performed at a lower voltage as tendency. If the ratio is 37.5% by mass or less, sufficient current efficiency can be developed.

[Blend Ratio]

In the case that the fluorine-containing polymer constituting layer (I) in the cation-exchange membrane of the present embodiment is a blend polymer of a copolymer of repeating units (A) and (C) and a copolymer of repeating units (A) and (D) as obtained with method 1, the weight ratio between the copolymer of repeating units (A) and (C) and the copolymer of repeating units (A) and (D), as (copolymer of repeating units (A) and (C))/(copolymer of repeating units (A) and (D)), is preferably 10/90 or more and 80/20 or less, more preferably 25/75 or more and 70/30 or less, and even more preferably 50/50 or less, but the weight ratio is not limited thereto. Because the monomer corresponding to repeating units (D) is easier to synthesize than that corresponding to repeating units (C), higher weight ratios of the copolymer of repeating units (A) and (D) make the synthesis technically easier, and superior supply stability for the fluorine-containing polymer is provided as a tendency.

[Water Content]

In the present embodiment, "water content" is a parameter correlating with clusters, which serve as paths for ions, and affects electrolysis voltage and curling of the membrane.

The water content measured for layer (I) in the first cation-exchange membrane is in the range of 26% or more and 35% or less, and preferably in the range of 26% or more and 34% or less.

If the water content is 26% or more, a lower AC resistance can be imparted to the cation-exchange membrane even in the case that repeating units (S) include neither repeating units (C) nor repeating units (D) each represented by formula (4), and it follows that electrolysis can be performed at a lower voltage. If the water content is 35% or less, sufficient strength that makes the membrane resistant to rupture can be ensured. If the water content is 34% or less, sufficient strength that makes the membrane resistant to rupture can be ensured.

The water content measured for layer (I) in the second cation-exchange membrane is in the range of 25% or more and 35% or less, and preferably in the range of 26% or more and 34% or less. If the water content is 25% or more, a lower AC resistance can be imparted to the cation-exchange membrane, and it follows that electrolysis can be performed at a lower voltage. If the water content is 35% or less, sufficient strength that makes the membrane resistant to rupture can be ensured. If the water content is 26% or more, electrolysis can be performed at an even preferred low voltage as a tendency. If the water content is 34% or less, sufficient strength that makes the membrane resistant to rupture can be ensured.

It should be noted that the above ranges are intended for values obtained by measurement for cation-exchange membranes before performing electrolysis, and water contents may reduce by about 1 to 2% from any of the above ranges in cation-exchange membranes after electrolysis. Therefore, a cation-exchange membrane with a water content reduced by 1 to 2% from any of the above ranges after electrolysis can be regarded as a cation-exchange membrane that satisfies any of the above ranges.

An example of measurement methods for water contents is shown in the following. For a water content, a membrane having a thickness of 500 μm or smaller and a weight of 0.5 g or more is soaked in pure water at 85° C. for 4 hours, and the weight of the membrane is then measured. This weight is defined as $W_{(wet)}$. Next, the membrane is dried with a ccc air dryer at −0.1 MPa and 90° C. for 3 hours, and the weight of the membrane is measured. This weight is defined as $W_{(dry)}$. The water content is represented by the following expression.

Water content=$100 \times (W_{(wet)} - W_{(dry)})/W_{(dry)}$

In this measurement method, 10 membranes are treated in the same manner to determine water contents, and the mean value is calculated.

The above measurement method for water contents is applied in Examples described later.

Since the cation-exchange membrane of the present embodiment is a multilayered-structure membrane, the cation-exchange membrane of the present embodiment is separated into monolayer membranes and then the water contents are measured. If the weight of a cation-exchange membrane after separation is less than 0.5 g, a plurality of cation-exchange membranes is combined to reach 0.5 g, and $W_{(dry)}$ and $W_{(wet)}$ are each determined as the total to calculate the water content.

Examples of regulating methods for adjusting the water content measured for layer (I) within any of the above ranges in the cation-exchange membrane of the present embodiment include, but are not limited to, control of the number of ion-exchange groups and TFE ratio in the polymer to predetermined values. Specifically, a water content is determined by the balance between the elastic energy and hydrophilicity of a polymer, and hence can be regulated by controlling the TFE ratio, which affects development of elastic energy, and the number of ion-exchange groups, which affects development of hydrophilicity.

[Water Content Difference]

To suppress curling, the water content difference between layer (I) and layer (II) in the cation-exchange membrane of the present embodiment is preferably 25% or less, more preferably 21% or less, and even more preferably 18% or less.

The water content of layer (II) in the cation-exchange membrane of the present embodiment is not limited, but preferably 9 to 21%, and more preferably 12 to 18%.

[Water Content/TFE Ratio]

In the present embodiment, "water content/TFE ratio" is a parameter correlating with the tendency of a cation-exchange membrane to curl. The presence or absence of curling in a cation-exchange membrane is determined not only by external force but also by the tendency of the membrane to curl.

External force is generated, for example, by an interlayer water content difference in a membrane, or the degree of swelling of a membrane to a core material embedded in the membrane. The tendency of a cation-exchange membrane to curl is, on the other hand, largely affected by the hardness of the membrane, and determined by the balance between the water content, which affects flexibility, and the TFE ratio, which affects rigidity. Therefore, control of water content/TFE ratio within a proper range enables effective suppression of curling of a cation-exchange membrane.

"Water content/TFE ratio" measured for layer (I) in the cation-exchange membrane of the present embodiment is not limited, but preferably in the range of 0.48 or more and 0.64 or less, and more preferably in the range of 0.48 or more and 0.56 or less.

If the water content/TFE ratio is 0.48 or more, a lower AC resistance can be imparted to the cation-exchange membrane, and it follows that electrolysis can be performed at a lower voltage as a tendency. If the water content/TFE ratio is 0.64 or less, curling of the cation-exchange membrane can be suppressed as a tendency with controlling the hardness of the cation-exchange membrane. If the water content/TFE ratio is 0.56 or less, desired effects of the present embodiment are more significantly exerted as a tendency.

Water content/TFE ratio can be calculated by using the above-described "water content" and "TFE ratio".

The measurement method for water content/TFE ratio is applied in Examples described later.

[EW of Layer (I)/EW of Layer (II)]

"EW of layer (I)/EW of layer (II)" in the cation-exchange membrane of the present embodiment is a parameter correlating with the tendency of the cation-exchange membrane to curl. The presence or absence of curling in a cation-exchange membrane is determined not only by external force but also the tendency of the membrane to curl.

The tendency of a membrane to curl is affected by the hardness of the membrane. External force is, on the other hand, affected by interlayer swelling rate difference in a membrane. A swelling rate is determined by the balance between hydrous properties and swelling properties, and EW can be used as the index. In common cation-exchange membranes, a primary part that causes curling because of large swelling rate difference is an interlayer part between a layer of a fluorine-containing polymer containing a sulfonic acid group and a layer of a fluorine-containing polymer containing a carboxylic acid group. Accordingly, proper control of the relation between them in terms of EW enables more effective suppression of curling.

In the cation-exchange membrane of the present embodiment, the relation between EW of layer (I) as a sulfonic acid layer and EW of layer (II) as a carboxylic layer, specifically, "EW of layer (I)/EW of layer (II)" is not limited, but preferably in the range of 0.6 or more and 0.8 or less, and more preferably in the range of 0.65 or more and 0.77 or less.

If "EW of layer (I)/EW of layer (II)" is 0.6 or more, curling can be more effectively suppressed as a tendency, and if "EW of layer (I)/EW of layer (II)" is 0.8 or less, a lower AC resistance can be imparted to the cation-exchange membrane, and it follows that electrolysis can be performed at a lower voltage as a tendency. If "EW of layer (I)/EW of layer (II)" is 0.65 or more and 0.77 or less, desired effects of the present embodiment are more significantly exerted as a tendency.

[Core Material]

It is preferable that the cation-exchange membrane of the present embodiment include a core material. By virtue of the core material, the strength and dimension stability of the cation-exchange membrane are increased as a tendency, and its position in the inside of the membrane main body is not limited, and the core material may be disposed any of an inside of layer (I), an inside of layer (II), and a part between layer (I) and layer (II), but preferably is positioned in an inside of layer (I) or a part between layer (I) and layer (II). In the case that the core material is disposed between a part between layer (I) and layer (II), one part of one core material and the other part thereof may be disposed in an inside of layer (I) and in an inside of layer (II), respectively. In the present embodiment, it is preferable that the core material be a woven fabric or the like formed by weaving reinforced thread. It is preferable for long-term thermal stability and chemical resistance that the material of the core material be a woven fabric of a fiber containing a fluorine polymer. Examples of the material of the core material include, but are not limited to, polytetrafluoroethylene (PTFE), tetrafluoroethylene-perfluoroalkyl vinyl ether copolymer (PFA), tetrafluoroethylene-ethylene copolymer (ETFE), tetrafluoroethylene-hexafluoropropylene copolymer, trifluorochloroethylene-ethylene copolymer, and vinylidene fluoride polymer (PVDF). In particular, it is preferred to use a woven fabric of a fiber containing polytetrafluoroethylene for the core material. The above-described fluorine polymer different from the fluorine-containing polymers constituting layer (I) and layer (II) can be applied as the core material, and a fluorine polymer having the same composition as them may be applied as the core material. In the case that a fluorine polymer having the same composition as layer (I) or layer (II) is applied as the core material, layer (I) or layer (II) and the core material can be distinguished from each other by their shapes, specifically, being layered or not.

The thread diameter of the core material is preferably 20 to 300 deniers, and more preferably 50 to 250 deniers, and the weave density (thread count per unit length) is preferably 5 to 50 counts/inch. Examples of the form of the core material include woven fabrics, nonwoven fabrics, and knitted fabrics, but it is preferable that the core material be in the form of a woven fabric. The thickness of the woven fabric is preferably 30 to 250 µm, and more preferably 30 to 150 µm.

The material and weaving method for a woven fabric or a knitted fabric are not limited, and, for example, a monofilament, a multifilament, or yarn or slit yarn of any of them is used, and various weaving methods are used such as plain weave, basic leno weave, knit weave, cord weave, and seersucker weave.

The aperture ratio of the core material is not limited, but preferably 30% or more, and more preferably 50% or more and 90% or less. The aperture ratio is preferably 30% or more from the viewpoint of electrochemical characteristics as an ion-exchange membrane, and preferably 90% or less from the viewpoint of the mechanical strength of the membrane. The aperture ratio refers to a fraction of the total of areas that allow substances including ions to pass therethrough (S2) to the total of the surface area of an ion-exchange membrane (S1), and expressed as (S2)/(S1). (S2) is the total of areas of regions in an ion-exchange membrane where ions, electrolyte solution, and so on are not blocked by the core material included in the ion-exchange membrane. A measurement method for aperture ratios is as follows: a transparent image is taken from the membrane surface side of an ion-exchange membrane (removed of a coating or the like that interferes with acquisition of a transparent image in advance of measurement), and (S2) can be determined from areas of parts lacking a core material (excluding a sacrifice core material and continuous holes); and then (S1) is determined from the area of the transparent image of the ion-exchange membrane, and the aperture ratio is determined by dividing (S2) by (S1).

A particularly preferred form among those various core materials is, for example, tape yarn obtained by slitting a high-strength porous sheet consisting of PTFE into a tape. Alternatively, preferred is a core material that uses 50 to 300 deniers of a highly oriented monofilament consisting of PTFE, consists of a plain weave configuration with a weave density of 10 to 50 counts/inch, and further has a thickness in the range of 50 to 100 µm and an aperture ratio of 60% or more.

Further, the woven fabric may include an auxiliary fiber typically called sacrifice yarn for the purpose of preventing slippage of yarn in the core material in membrane production processes. Inclusion of such sacrifice yarn allows formation of continuous holes in the cation-exchange membrane.

The sacrifice yarn has solubility in membrane production processes or under an electrolysis environment and is not limited, and, for example, rayon, polyethylene terephthalate (PET), cellulose, and polyamide are used therefor. The ratio of mixed weaving in this case is preferably 10% by mass or more and 80% by mass or less, more preferably 30% by mass or more and 70% by mass or less, to the whole woven fabric or knitted fabric.

[Strength/Elongation of Core Material]

In the cation-exchange membrane of the present embodiment, it is preferable that the elongation of the core material in MD at 30 N be 10 GL % or less and/or the elongation of the core material in TD at 30 N is 10 GL % or less.

If the elongation of the core material at a load of 30 N is 10 GL % or less, the dimension stability of the membrane can be ensured as a tendency. If the elongation is 1 GL % or more, a problem of the break of the core material in bending is less likely occur; if the elongation is 3 GL % or more, bendability is developed and good handling is achieved in the cation-exchange membrane as a tendency; if the elongation is 9 GL % or less, sufficient strength that makes the membrane resistant to rupture can be ensured as a tendency.

Here, MD (machine direction) is a direction in which the membrane main body and various members (such as the core material) is conveyed (direction of flowing) in production of the cation-exchange membrane described later. TD (transverse direction refers to a direction generally perpendicular to MD.

For the strength/elongation of the core material, a sample having a width in MD of 1 cm and a length in TD of 14 cm is cut out of the core material, and is chucked with chucks each having a length of 14 cm at both ends at a chuck-to-chuck distance of 5 cm, and the elongation at a load of 30 N can be measured through tensile test by elongating at 23° C. at a speed of 100 mm/min. The above preferred numerical values of the strength/elongation of the core material are values obtained through measurement for the core material before electrolysis.

In the case that tape yarn is applied to the core material that can be included in the cation-exchange membrane of the present embodiment, for example, simple yarn has insufficient dimension stability because twisted portions are elongated like springs; however, drawing yarn with heating imparts superior dimension stability to the core material, and as a result the core material successfully achieves an elongation of 10 GL % or less at a load of 30 N. Then, the core material tends to have a larger elongation as the drawing ratio is decreased, and tends to have a smaller elongation as the drawing ratio is increased. The core material tends to have a larger elongation as the heating temperature is increased, and tends to have a smaller elongation as the heating temperature is decreased.

[Continuous Holes]

The cation-exchange membrane of the present embodiment may include continuous holes in the membrane. In the present embodiment, a continuous hole refers to a hole that can serve as a channel for cations generated in electrolysis and electrolyte solution. With formation of continuous holes, the mobilities of alkali ions generated in electrolysis and electrolyte solution are further enhanced as a tendency. The shape of each continuous hole is not limited, and can be the shape of sacrifice yarn to be used for formation of continuous holes through a production method described later.

In the present embodiment, it is preferable that continuous hole be formed so that they alternately pass through the anode side and cathode side of the core material. By virtue of such a structure, cations (e.g., sodium ions) transported through electrolyte solution filling the continuous holes can flow also to the cathode side of the core material in portions in which continuous holes are formed in the cathode side of the core material. As a result, cation flow is not interrupted, and thus the electrical resistance of the ion-exchange membrane can be further reduced as a tendency.

FIG. 1 shows a schematic cross-sectional view of an example of the configuration of the cation-exchange membrane according to the present embodiment. The cation-exchange membrane of the present embodiment includes: a layer 4 (layer I) and a layer 5 (layer II) laminated; and a core material 3 and continuous holes 2a and 2b in the inside of the membrane. The core material 3 is, for example a woven fabric of PTFE monofilaments, and between such monofilaments, for example, PET fibers are woven in the same manner as the monofilaments. The warp and the weft have the same configuration. Typically, the layer 4 containing a fluorine-containing polymer containing a sulfonic acid group is disposed in an anode side α of an electrolyzer, and the layer 5 containing a fluorine-containing polymer containing a carboxylic acid group is disposed in a cathode side β of the electrolyzer. In the example in FIG. 1, coating layers 6 and 7 are included on the membrane surface.

In FIG. 1, the continuous hole 2a and the core material 3 are formed in the direction perpendicular to the sheet, and the continuous hole 2b is formed in the vertical direction in the sheet. It follows that the continuous hole 2b formed in the vertical direction in the sheet is formed along the direction generally perpendicular to the core material 3. The continuous holes 2a and 2b may each include a portion 8 that is opening in the anode-side surface of the layer 4. As illustrated in FIG. 1, it is preferable for the cation-exchange membrane of the present embodiment that the layer 4 and the layer 5 be laminated so that the surface of the layer 4 and the surface of the layer 5 are contacting together. Herein, the layer 4 and the layer 5 (and the core material 3, as necessary) are occasionally referred to as the membrane main body in a collective manner.

In the present embodiment, it is preferable that an opening portion be formed in at least one surface of the membrane main body. Here, an opening portion refers to a portion where a part of a continuous hole is positioned in one surface of the membrane main body to form an opening in the surface. Opening portions formed in the membrane surface and continuous holes formed in the membrane and communicating opening portions facilitate supply of electrolyte solution even into the inside of the ion-exchange membrane in electrolysis, and as a result enhanced electrolysis performance is provided as a tendency.

[Coating]

The cation-exchange membrane of the present embodiment can include a coating layer disposed on at least one surface of the membrane main body, and the coating layer can prevent attachment of gas on the cathode-side surface and anode-side surface in electrolysis.

The material constituting the coating layer is not limited, and preferably contains an inorganic substance to prevent attachment of gas. Examples of the inorganic substance include zirconium oxide and titanium oxide. In forming the coating layer in the membrane main body, the method is not limited, and any known method can be used. Examples thereof include a method of applying a solution containing microparticles of an inorganic oxide dispersed in a binder polymer solution with a spray or the like.

Examples of the binder polymer include a vinyl compound including a functional group that can be converted into a sulfone-type ion-exchange group. There is no limitation to the application conditions, and, for example, a spray can be used at 30 to 90° C. Examples of application methods other than the spray method include roll coating.

For prevention of attachment of gas and increase in electrical resistance caused by thickness, it is preferable that the average thickness of the coating layer be 1 to 10 μm.

[Configuration of Membrane Main Body]

The configuration of the membrane main body of the cation-exchange membrane of the present embodiment is not limited as long as the configuration includes at least one layer of layers (I) and (II). That is, layer (I) may be of a monolayer or multiple layers. Similarly, layer (II) may be of a monolayer or multiple layers. In addition to layer (I) and layer (II), any additional layer may be included. The cation-exchange membrane of the present embodiment can be configured by appropriately combining the above configurations. The following describes an embodiment that can be especially preferably employed.

The cation-exchange membrane of the present embodiment can be configured to have a laminate structure consisting of layer (I) and layer (II) with a core material disposed in an inside of layer (I). It is more preferable that layer (I) and layer (II) in the laminate structure be each an outermost layer, and the core material be positioned in the vicinity of the (α)-side surface of the surface of layer (I) in FIG. 1.

The cation-exchange membrane of the present embodiment can be configured to have a laminate structure in which layer (I) consists of: layer (I-1) containing a copolymer containing repeating units (A) and repeating units (D); and a layer different from layer (I-1). The layer different from layer (I-1) in the laminate structure is not limited as long as the layer is composed of a polymer of different type from that in layer (I-1), and, for example, may be a layer containing a copolymer containing repeating units (A) and repeating units (C), or a layer containing a copolymer containing repeating units (A), repeating units (C), and repeating units (D). Even in the case that different layers include common repeating units, they can be regarded as being composed of different types of polymers if they are different in "other units corresponding to none of repeating units (A), (C), and (D)" (the same is applied hereinafter).

The cation-exchange membrane of the present embodiment can be configured to have a laminate structure in which layer (I) consists of: layer (I-2) containing a copolymer containing repeating units (A) and repeating units (C); and a layer different from layer (I-2). The layer different from layer (I-2) in the laminate structure is not limited as long as the layer is composed of a polymer of different type from that in layer (I-2), and, for example, may be a layer containing a copolymer containing repeating units (A) and repeating units (D), or a layer containing a copolymer containing repeating units (A), repeating units (C), and repeating units (D).

The cation-exchange membrane of the present embodiment can be configured to have a laminate structure in which layer (I) includes: layer (I-3) that is an outermost layer of the cation-exchange membrane and includes a core material; and a layer different from layer (I-3). "Layer different from layer (I-3)" in the laminate structure is not limited as long as the layer includes no core material. The layer different from layer (I-3) may be, for example, a layer containing a copolymer containing repeating units (A) and repeating units (C), or a layer containing a copolymer containing repeating units (A) and repeating units (D), or a layer containing a copolymer containing repeating units (A), repeating units (C), and repeating units (D), or multiple layers consisting of any combination of them.

The cation-exchange membrane of the present embodiment can be configured to have a laminate structure in which layer (I) includes: layer (I-1) containing a copolymer containing repeating units (A) and repeating units (D); layer (I-2) containing a copolymer containing repeating units (A) and repeating units (C); and a layer different from layer (I-1) and layer (I-2). "Layer different from layer (I-1) and layer (I-2)" is not limited as long as the layer is an additional layer to layer (I-1) and layer (I-2), and the composition may be the same as that of layer (I-1) or layer (I-2). For example, the layer may be a layer containing copolymer (AC) containing repeating units (A) and repeating units (C), or a layer containing copolymer (AD) containing repeating units (A) and repeating units (D), or a layer containing a mixture of copolymer (AC) and copolymer (AD). Alternatively, the layer may be a layer containing a copolymer containing repeating units (A), repeating units (C), and repeating units (D).

The thickness of layer (I) in the cation-exchange membrane of the present embodiment is not limited, but preferably 5 μm or larger and 150 μm or smaller. If the thickness of layer (I) is within the range, an effect of reducing voltage can be sufficiently developed as a tendency.

The thickness of layer (II) in the cation-exchange membrane of the present embodiment is not limited, but preferably 5 μm or larger and 50 μm or smaller. If layer (II) satisfies the range, a sufficiently high current efficiency can be developed as a tendency.

The total thickness of layer (I) and layer (II) is not limited, but preferably 35 μm or larger and 200 μm or smaller, and more preferably 55 μm or larger and 150 μm or smaller. If the total thickness of layer (I) and layer (II) is within the range, the cation-exchange membrane tends to have strength and preferred electrolysis performance.

If layer (I) consists of multiple layers, it is preferable that the thickness of the whole of layer (I) satisfy the above numerical range. The same is applied to layer (II).

With regard to values of physical properties relating to the above-described total ion-exchange capacity, EW, TFE ratio, polymer composition ratio, water content, water content difference, and water content/TFE ratio of layer (I) in the case that layer (I) consists of multiple layers in the cation-exchange membrane of the present embodiment, it is preferable that in terms of each physical property, the average value for the layers satisfy the corresponding numerical range. The same is applied to layer (II).

The cation-exchange membrane of the present embodiment is applicable to membranes for various types of electrolysis, and is especially preferably used for chloro-alkali electrolysis.

[Evaluation of Curling]

As described above, the occurrence of curling causes the membrane to bend in membrane production, in particular, in the step of hydrolysis, leading to serious problems such as failure in winding of the membrane after hydrolysis, handling failure in handling, and failure in setting the membrane in electrolysis; on the other hand, the cation-exchange membrane of the present embodiment can effectively prevent the occurrence of curling by virtue of inclusion of the above-described configuration. Curling of cation-exchange membranes can be evaluated with a method shown in the following.

A membrane of 40 cm×30 cm is prepared as an evaluation sample, and evaluation is made on how much the membrane curls in the 40-cm direction. As illustrated in FIG. 3, a cation-exchange membrane 1 is fixed at an end to become horizontal, and how much the other end curls to the horizontal plane as being observed from the X-X' cross-section is quantified in terms of angle φ. Larger φ indicates more serious curling, and it is preferable for the cation-exchange membrane of the present embodiment that φ measured with a method described later in Examples be 90° or smaller.

[Production Method for Cation-Exchange Membrane]

Subsequently, a production method for the cation-exchange membrane of the present embodiment will be described.

The production method for the cation-exchange membrane of the present embodiment is not limited, but preferably includes steps 1) to 5) below.

Preferred is a production method including:
1) a step of producing a fluorine-containing polymer containing an ion-exchange group or an ion-exchange group precursor that can become an ion-exchange group through hydrolysis (polymer production step);

2) a step of obtaining a core material including sacrifice yarn woven thereinto (core material production step);

3) a step of forming the fluorine-containing polymer containing an ion-exchange group or an ion-exchange group precursor that can become an ion-exchange group through hydrolysis into a film (film formation step);

4) a step of embedding the core material and the film to form a composite membrane (embedding step); and 5) a step of hydrolyzing the composite membrane with an acid or an alkali (hydrolysis step).

Through 1) polymer production step among the above steps, for example, the composition of the fluorine-containing polymer in the cation-exchange membrane of the present embodiment is regulated. Each step will be described in detail in the following.

Step 1) (Polymer Production Step)

The fluorine-containing polymers in the present embodiment can be produced with the method described in the section (Fluoropolymer) above.

Step 2) (Core Material Production Step)

In the cation-exchange membrane of the present embodiment, it is preferable for further enhancement of the strength of the membrane that the core material be embedded in the membrane. To form an ion-exchange membrane including continuous holes, sacrifice yarn is woven together into the core material. The ratio of mixed weaving in this case is preferably 10% by mass or more and 80% by mass or less, more preferably 30% by mass or more and 70% by mass or less, to the whole core material. Preferred is sacrifice yarn having a thickness of 20 to 50 deniers and consisting of monofilaments or multifilaments of polyvinyl alcohol or the like.

Step 3) (Film Formation Step)

The method for forming the fluorine-containing polymer obtained in step 1) into a film is not limited, but use of an extruder is preferred. Examples of the film formation method include the following method.

In the case of a bilayer structure of layer (I) and layer (II) in the present embodiment, for example, a method of separately film-forming to form a cation-exchange membrane constituting layer (I) (sulfonic acid layer) and a cation-exchange membrane constituting layer (II) (carboxylic acid layer).

In the case that layer (I) has an arbitrary bilayer structure, that is, in the case of a trilayer structure consisting of layer (II), fluorine-containing polymer layer (I-1), and fluorine-containing polymer layer (I-2), for example, fluorine-containing polymer layer (I-1) and layer (II) are formed into a composite film through coextrusion; and separately fluorine-containing polymer layer (I-2) is singly formed into a film, and can be laminated on the composite film of layer (I-1) and layer (II). Alternatively, fluorine-containing polymer layer (I-1) and fluorine-containing polymer layer (I-2) are formed into a composite film through coextrusion to form layer (I)'; and separately layer (II) is singly formed into a film, and can be laminated on layer (I)'. Among them, coextrusion of fluorine-containing polymer layer (I-1) and layer (II) is preferred because the adhesion strength of the interface can be increased.

Step 4) (Embedding Step)

In the embedding step, it is preferred to embed the core material obtained in step 2) and the film obtained in step 3) on a drum with an increased temperature. On the drum, they are embedded via a sheet of thermally resistant release paper with air permeability to integrate them, while each interlayer air is removed, under reduced pressure at a temperature at which the fluorine-containing polymers constituting the layers melt. Thereby, a composite membrane can be obtained. Examples of the drum include, but are not limited to, a drum including a heat source and a vacuum source and having many pores in the surface.

With regard to the order of lamination of the core material and the film, the following method according to step 3) is exemplified.

An example in the case that layer (I) and layer (II) are each composed of a monolayer is a method of laminating, above the drum, a sheet of release paper, the film of layer (I), the core material, and the film of layer (II) in the order presented.

In the case that layer (I) has an arbitrary bilayer structure, that is, in the case of a trilayer structure consisting of layer (II), fluorine-containing polymer layer (I-1), and fluorine-containing polymer layer (I-2), a sheet of release paper, the film of fluorine-containing polymer layer (I-2), the core material, and the composite film of fluorine-containing polymer layer (I-1) and layer (II) are laminated above the drum in the order presented. Alternatively, a sheet of release paper, the composite film of fluorine-containing polymer layer (I-2) and fluorine-containing polymer layer (I-1), the core material, and layer (II) are laminated above the drum in the order presented.

To provide projections on the membrane surface of the ion-exchange membrane of the present embodiment, a sheet of release paper embossed in advance is used to allow formation of projections consisting of melted polymer in embedding.

Step 5) (Hydrolysis Step)

The composite membrane obtained in step 4) is hydrolyzed with an acid or an alkali. It is preferred to perform hydrolysis, for example, in an aqueous solution of 2.5 to 4.0 N potassium hydroxide (KOH) and 20 to 40% by mass DMSO (dimethyl sulfoxide) at 40 to 90° C. for 10 minutes to 24 hours. It is preferred to perform thereafter salt exchange treatment with 0.5 to 0.7 N caustic soda (NaOH) solution under conditions of 80 to 95° C. To prevent elevation of electrolysis voltage, it is preferable that the treatment time for the salt exchange treatment be shorter than 2 hours.

[Electrolyzer]

Subsequently, an electrolyzer including the cation-exchange membrane of the present embodiment will be described.

The electrolyzer of the present embodiment includes the cation-exchange membrane of the present embodiment. In more detail, the electrolyzer of the present embodiment can include: an anode; a cathode; and the cation-exchange membrane of the present embodiment disposed between the anode and the cathode. FIG. 2 shows a schematic diagram of an example of the electrolyzer of the present embodiment. An electrolyzer 13 illustrated in FIG. 2 includes: an anode 11; a cathode 12; and a cation-exchange membrane 1 having a bilayer structure (hereinafter, referred to as the bilayer-structure membrane 1) and disposed between the anode and the cathode.

The bilayer-structure membrane 1 corresponds to the cation-exchange membrane of the present embodiment, and composed of layer (II) (carboxylic acid layer) and layer (I) (sulfonic acid layer). Layer (II) can be disposed to face the cathode.

In chloro-alkali electrolysis using the electrolyzer illustrated in FIG. 2, $Na^+$ ions can be allowed to pass from the anode chamber to the cathode chamber, and on the other hand migration of OH⁻ ions from the anode chamber to the cathode chamber can be inhibited. The bilayer-structure membrane 1 can much more reliably achieve low electrolysis voltage together with curl suppression by virtue of layer (I) and layer (II) disposed therein. As a result, reduction of power consumption in electrolysis is successfully achieved. Accordingly, the electrolyzer of the present embodiment can more contribute to energy saving than conventional ones.

There is no limitation to the electrolysis conditions, and electrolysis can be performed under known conditions. For example, electrolysis can be performed under conditions of an electrolysis temperature of 50 to 120° C. and a current density of 0.5 to 10 kA/m² while 2.5 to 5.5 N alkali chloride aqueous solution is fed to the anode chamber and water or diluted alkali hydroxide aqueous solution is fed to the cathode chamber.

The configuration of the electrolyzer of the present embodiment is not limited, and may be, for example, of monopolar type or of bipolar type. The material that constitutes the electrolyzer is not limited, and, for example, the material of the anode chamber is preferably titanium and so on, which are resistant to alkali chloride and chlorine, and the material of the cathode chamber is preferably nickel and so on, which are resistant to alkali hydroxide and hydrogen. The electrodes may be disposed with an appropriate interval between the ion-exchange membrane and the anode, and may be disposed in such a manner that the anode and the ion-exchange membrane are contacting with each other. While a cathode is generally disposed with an appropriate interval from an ion-exchange membrane, the electrolyzer may be a contact-type electrolyzer (zero-gap electrolyzer) without such an interval.

There is no limitation to conditions for the chloro-alkali electrolysis process, but the salt water concentration in the anode chamber is set to 180 to 215 g/L, preferably to 185 to 205 g/L. The concentration of the cathode solution is set to 28 to 35%, preferably to 30 to 33%. Further, conditions of a current density of 1 to 6 kA/m² and a temperature of 70 to 90° C. are used. With regard to the model of the electrolyzer, the power supply method therefor, and the model of electrodes, the cation-exchange membrane of the present embodiment is applicable to any known model and method, and in particular widely applicable to finite-gap to zero-gap electrode dispositions.

[Evaluation of Electrolysis Performance]

In evaluation of the electrolysis performance of the cation-exchange membrane, electrolysis is performed under conditions below with use of an electrolyzer (layer (II) of the cation-exchange membrane is facing the cathode) illustrated in FIG. 2, and the electrolysis performance can be evaluated in terms of the amount of power consumption required to produce 1 t of NaOH on the basis of the electrolysis voltage and current efficiency.

[Measurement of Electrolysis Voltage]

Used for electrolysis is an electrolyzer having a structure in which the cation-exchange membrane is disposed between an anode and a cathode and four zero-gap electrolytic cells of natural circulation type are arranged in series. For the cathode, a woven mesh obtained by weaving nickel fine wire coated with cerium oxide and ruthenium oxide as a catalyst and having a diameter of 0.15 mm at 50-mesh opening is used. For close contact between the cathode and the cation-exchange membrane, a mat woven with nickel fine wire is disposed between a current collector consisting of an expanded metal made of nickel and the cathode. Used for the anode is an expanded metal made of titanium and coated with an oxide of ruthenium, an oxide of iridium, and an oxide of titanium as a catalyst. With use of the above electrolyzer, salt water is fed to the anode side with adjustment to reach a concentration of 205 g/L, and water is fed with keeping a caustic soda concentration of 32% by mass in the cathode side. The temperature of the electrolyzer is set to 85° C., and electrolysis is performed under such conditions that the current density is 6 kA/m² and the liquid pressure in the cathode side of the electrolyzer is higher than the liquid pressure in the anode side by 5.3 kPa. The anode-cathode interelectrode voltage in the electrolyzer is measured by using a voltmeter manufactured by KEYENCE CORPORATION every day, and the electrolysis voltage can be determined as the 7-day average value.

[Measurement of Current Efficiency]

Current efficiency can be determined by dividing the number of moles of caustic soda generated in a predetermined period of time, which is determined from measurement of the mass and concentration of caustic soda generated, by the number of moles of electrons of a current flowing during the period of time.

EXAMPLES

Hereinafter, the present embodiment will be described in detail with Examples. However, the present embodiment is not limited to Examples below.

In Examples and Comparative Examples, EW, total ion-exchange capacity, water contents, TFE ratios, electrolysis voltage, current efficiency, and curling angles were measured in accordance with the following methods.

For values of physical properties relating to the above-described total ion-exchange capacity, EW, TFE ratio, polymer composition ratio, water content, water content difference, and water content/TFE ratio of layer (I) in the case that layer (I) consisted of multiple layers, average values for the layers were calculated.

[Total Ion-Exchange Capacity and EW]

Approximately 1 g of each of fluorine-containing polymers A1 to A3, fluorine-containing polymers B1 to B6, blend polymers BA1 to BA6, blend polymers BB1 to BB3, and fluorine-containing polymers D1 to D3 in examples described later, as a fluorine-containing polymer containing an ion-exchange group, was used to subjected to press molding at 290° C. and a pressure of 15 kgf/cm² for 4 minutes, providing a film corresponding to the polymer.

The film obtained was subjected to neutralization titration to measure the total ion-exchange capacity, which was substituted into the following expression to calculate the EW.

$$EW = 1/\text{"total ion-exchange capacity"} \times 1000$$

[TFE Ratio]

Approximately 1 g of each of fluorine-containing polymers A1 to A3, fluorine-containing polymers B1 to B6, blend polymers BA1 to BA6, blend polymers BB1 to BB3, and fluorine-containing polymers D1 to D3 in examples described later, as a fluorine-containing polymer containing an ion-exchange group, was used to subjected to press molding at 290° C. and a pressure of 15 kgf/cm² for 4 minutes, providing a film corresponding to the polymer.

In a nuclear magnetic resonance apparatus (Avance500 manufactured by Bruker BioSpin), N-methylacetamide as a swelling agent was added to the film obtained, which was sufficiently swollen by heating to 200° C., and subjected to solid ¹⁹F-NMR measurement. The measurement temperature was set to 200° C., the rotation frequency of magic angle spinning was set to 5 kHz, the irradiation pulse width was set to 30°, and measurement was performed with a single pulse method. For a shift reference, a $CF_2$ signal, which is a main signal, was set to –119 ppm. Attribution of signals was in accordance with FIG. 1 in Japanese Patent Laid-Open No. 2004-279112.

In the solid $^{19}F$-NMR spectrum acquired for each film under the above conditions, an area value of signal a at approximately –140 ppm for side chain CF, an area value of signal b at –130 to –136 ppm for main chain CF, and an area value of signal c at –110 to –123 ppm, a region detected for main chain $CF_2$ and $CF_2$ adjacent to side chain end $SO_3M$, were calculated; for each film found from the signals to include only either one of repeating units (C) and (D) together with repeating units (A), the TFE ratio was calculated by using expression (α).

$$TFE\ ratio = ((EW - \text{Molecular weight of repeating unit (C) and/or Molecular weight of repeating unit (D)})/EW) \times 100 \quad (\alpha)$$

For each film found from the signals to include both repeating units (C) and (D) together with repeating units (A), the ratios of repeating units (A), (C), and (D) were calculated from the signals as follows.

Ratio of repeating units (A): (Area value of signal c–2×Area value of signal a–2×Area value of signal b)/4

Ratio of repeating units (C): Area value of signal b–Area value of signal a

Ratio of repeating units (D): Area value of signal a

From the ratios of repeating units (C) and (D) obtained as above, the average molecular weight of each exchange group-containing monomer was calculated, and introduced into expression (α) to calculated the TFE ratio.

In the above-described measurement method, 10 membranes were treated in the same manner to determine TFE ratios, and the mean value was used as the TFE ratio.

[Water Content]

Each cation-exchange membrane was separated into monolayers to prepare membrane samples having a thickness of 500 μm or smaller and a weight of 0.5 g or more, and each membrane was soaked in pure water at 85° C. for 4 hours, and the weight of the membrane was then measured, and this weight was defined as $W_{(wet)}$. Next, the membrane was dried with a vacuum dryer at –0.1 MPa and 90° C. for 3 hours, and the weight of the membrane was measured, and this weight was defined as $W_{(dry)}$. On the basis of these values, the water content was calculated by using the following expression.

$$\text{Water content} = 100 \times (W_{(wet)} - W_{(dry)})/W_{(dry)}$$

If the weight of a membrane after separation was less than 0.5 g, a plurality of membranes was combined to reach 0.5 g, and $W_{(dry)}$ and $W_{(wet)}$ were each determined as the total to calculate the water content.

In the above measurement, 10 membranes were treated in the same manner to determine water contents, and the mean value was used as the water content.

[Evaluation of Curling]

A membrane of 40 cm×30 cm was prepared as an evaluation sample, and evaluation was made on how much the membrane curled in the 40-cm direction. Specifically, as illustrated in FIG. 3, a cation-exchange membrane 1 was fixed at an end to become horizontal, and how much the other end curled to the horizontal plane as being observed from the X-X' cross-section was quantified in terms of angle ϕ. Assuming that larger ϕ indicates more serious curling, cases that ϕ was 90° or smaller were rated that curling was suppressed, and cases that ϕ was over 90° were rated that curling was not suppressed successfully. Curling was measured after a hydrolysis step in each example described later, that is, after an ion-exchange membrane was taken out of an aqueous solution containing 0.5 N sodium hydroxide (NaOH) at 50° C. and then further left to stand under conditions of 25° C. and 60% RH for 1 minute.

[Evaluation of Electrolysis Performance]

Electrolysis was performed under conditions below with use of an electrolyzer illustrated in FIG. 2 (layer (II) of the cation-exchange membrane was disposed to face the cathode). In a measurement system in the following, electrolysis voltages of approximately 2.945 V/6 kA or less were rated as being preferred.

[Measurement of Electrolysis Voltage]

Used for electrolysis was an electrolyzer having a structure in which a cation-exchange membrane was disposed between an anode and a cathode and four zero-gap electrolytic cells of natural circulation type were arranged in series. For the cathode, a woven mesh obtained by weaving nickel fine wire coated with cerium oxide and ruthenium oxide as a catalyst and having a diameter of 0.15 mm at 50-mesh opening was used. For close contact between the cathode and the cation-exchange membrane, a mat woven with nickel fine wire was disposed between a current collector consisting of an expanded metal made of nickel and the cathode. Used for the anode was an expanded metal made of titanium and coated with an oxide of ruthenium, an oxide of iridium, and an oxide of titanium as a catalyst. With use of the above electrolyzer, salt water was fed to the anode side with adjustment to reach a concentration of 205 g/L, and water was fed with keeping a caustic soda concentration of 32% by mass in the cathode side. The temperature of the electrolyzer was set to 85° C., and electrolysis was performed under such conditions that the current density was 6 kA/m² and the liquid pressure in the cathode side of the electrolyzer was higher than the liquid pressure in the anode side by 5.3 kPa. The anode-cathode interelectrode voltage in the electrolyzer was measured by using a voltmeter manufactured by KEYENCE CORPORATION every day, and the electrolysis voltage was determined as the 7-day average value.

Current efficiency was determined by dividing the number of moles of caustic soda generated in a predetermined period of time, which was determined from measurement of the mass and concentration of caustic soda generated, by the number of moles of electrons of a current flowing during the period of time. The number of moles of caustic soda was determined by collecting caustic soda generated through electrolysis in a plastic tank and measuring the mass.

Polymerization Examples 1 to 10

In order to produce fluorine-containing polymers to form layer (I-1) and layer (I-2), polymerization was performed by using a monomer represented by general formula (1'), and monomers represented by general formulas (3') and (4') as sulfonic acid group-containing monomers.

$$CF_2=CF_2 \quad (1')$$

$$CF_2=CF_O(CF_2)_2SO_2F \quad (3')$$

$$CF_2=CFOCF_2CF(CF_3)O(CF_2)_2SO_2F \quad (4')$$

Fluorine-containing polymers A1 to A3, fluorine-containing polymers B1 to B6, and fluorine-containing polymer C1 were produced through solution polymerization shown below. For fluorine-containing polymers A1 to A3, general formula (1') and general formula (3') were used; for fluorine-containing polymers B1 to B6, general formula (1') and general formula (4') were used; for fluorine-containing polymer C1, general formula (1'), general formula (3'), and general formula (4') were used.

More specifically, fluorine-containing polymers A1 to A3, fluorine-containing polymers B1 to B6, and fluorine-containing polymer C1 were produced through solution polymerization shown in the following.

First, a 20-L stainless steel autoclave was charged with a sulfonic acid group-containing monomer and $CF_3CHFCHFCF_2CF_3$ (HFC43-10mee) solution, and the inside of the container was sufficiently purged with nitrogen. Thereafter, the inside of the container was further purged with TFE (trifluoroethylene, $CF_2=CF_2$), and heating was performed until the temperature in the container became stable at 35° to pressurize with TFE. Only for fluorine-containing polymer C1, a product prepared by mixing in advance general formulas (2') and (3') at a ratio of 1:2 was used.

Subsequently, 5% HFC43-10mee solution of $(CF_3CF_2CF_2COO)_2$ as a polymerization initiator was added to initiate reaction. While TFE was intermittently fed with stirring at 35° C., 5% HFC43-10mee solution of $(CF_3CF_2CF_2COO)_2$ was added in the middle, and the TFE pressure was decreased. When the amount of TFE fed was reached a predetermined amount, methanol was added to terminate the polymerization. After unreacted TFE was released out of the system, the resulting polymerization solution was dried under reduced pressure, thereby distilling off unreacted monomers and HFC43-10mee to afford each of fluorine-containing polymers A1 to A3 and fluorine-containing polymers B1 to B6. The fluorine-containing polymers obtained were pelletized by using a twin-screw devolatilizing extruder.

The conditions were adjusted at this time to produce fluorine-containing polymers A1 to A3 and fluorine-containing polymers B1 to B6 differing in EW as listed in Table 1.

TABLE 1

|  | Repeating unit | EW |
|---|---|---|
| Polymerization Example 1 | Fluorine-containing polymer A1 | A + C | 690 |
| Polymerization Example 2 | Fluorine-containing polymer A2 | A + C | 700 |
| Polymerization Example 3 | Fluorine-containing polymer A3 | A + C | 800 |
| Polymerization Example 4 | Fluorine-containing polymer B1 | A + D | 885 |
| Polymerization Example 5 | Fluorine-containing polymer B2 | A + D | 900 |
| Polymerization Example 6 | Fluorine-containing polymer B3 | A + D | 909 |
| Polymerization Example 7 | Fluorine-containing polymer B4 | A + D | 950 |
| Polymerization Example 8 | Fluorine-containing polymer B5 | A + D | 970 |
| Polymerization Example 9 | Fluorine-containing polymer B6 | A + D | 920 |
| Polymerization Example 10 | Fluorine-containing polymer C1 | A + C + D | 870 |

[Blends BA1 to BA6, BB1 to BB3]

At a ratio shown in Table 2 below, two polymers of fluorine-containing polymer A and fluorine-containing polymer B were kneaded by using the co-rotation twin-screw extruder HK-25D (manufactured by PARKER CORPORATION, screw diameter: ϕ25 mm, L/D=41) at 240° C. and a rotation frequency of 20 rpm to afford each of blend polymers BA1 to 6 and blend polymers BB1 to 3.

Table 2 shows EW, water contents, TFE ratios and water content/TFE ratio of the blend polymers obtained.

TABLE 2

| Blend polymer | BA1 | BA2 | BA3 | BA4 | BA5 | BA6 | BB1 | BB2 | BB3 |
|---|---|---|---|---|---|---|---|---|---|
| Fluorine-containing polymer A | A2 | A2 | A2 | A3 | A2 | A2 | A1 | A2 | A2 |
| Ratio (wt %) | 50 | 30 | 15 | 25 | 90 | 30 | 80 | 10 | 10 |
| Fluorine-containing polymer B | B5 | B5 | B4 | B2 | B5 | B4 | B1 | B2 | B5 |
| Ratio (wt %) | 50 | 70 | 85 | 75 | 10 | 70 | 20 | 90 | 90 |
| SEW | 813 | 869 | 902 | 873 | 720 | 858 | 722 | 875 | 934 |
| Water content | 30.5 | 27.2 | 27.5 | 33.1 | 34.8 | 29.4 | 40.3 | 36.0 | 24.0 |
| TFE ratio | 57.5 | 56.2 | 54.4 | 54.4 | 59.6 | 55.6 | 57.8 | 51.6 | 54.8 |
| Water content/TFE | 0.53 | 0.48 | 0.50 | 0.61 | 0.58 | 0.53 | 0.70 | 0.70 | 0.44 |

Polymerization Examples 11 to 13

In order to produce fluorine-containing polymers to form layer (II), polymerization was performed by using a monomer represented by general formula (1') and a monomer represented by general formula (5') as a carboxylic acid group-containing monomer.

$CF_2=CFOCF_2CF(CF_3)O(CF_2)_2COOCH_3$ (5')

Fluorine-containing polymers D1 to D3 were produced through solution polymerization shown below. For fluorine-containing polymers D1 to D3, general formula (1') and general formula (5') were used.

More specifically, fluorine-containing polymers D1 to D3 were produced through solution polymerization shown in the following.

First, a 20-L stainless steel autoclave was charged with $CF_2=CFOCF_2CF(CF_3)O(CF_2)_2COOCH_3$ and HFC-43-10mee solution, the inside of the container was sufficiently purged with nitrogen, thereafter further purged with $CF_2=CF_2$ (TFE), and heating was performed until the temperature in the container became stable at 35° C. to pressurize with TFE.

Subsequently, 5% HFC43-10mee solution of $(CF_3CF_2CF_2COO)_2$ as a polymerization initiator was added to initiate reaction. At this time, methanol was added as a chain transfer agent. While TFE was intermittently fed with stirring at 35° C., methanol was added in the middle and the TFE pressure was decreased, and when the amount of TFE fed was reached a predetermined amount, the reaction was terminated. After unreacted TFE was released out of the system, methanol was added to the resulting polymerization solution to cohere and separate the fluorine-containing polymer. Additional drying gave each of fluorine-containing polymers D1 to D3. The fluorine-containing polymers obtained were pelletized by using a twin-screw extruder.

The above conditions were adjusted to produce fluorine-containing polymers D1 to D3 differing in EW as listed in Table 3.

TABLE 3

|  |  | EW |
|---|---|---|
| Polymerization Example 11 | Fluorine-containing polymer D1 | 1150 |
| Polymerization Example 12 | Fluorine-containing polymer D2 | 1180 |
| Polymerization Example 13 | Fluorine-containing polymer D3 | 1125 |

[Membrane Formation]

Membrane formation was performed by using blend polymers BA1 to BA6 and BB1 to BB3, fluorine-containing polymers B3, B4, and C1, and fluorine-containing polymers D1 to D3 in combination as shown in Table 4 to produce samples of Examples 1 to 12 and samples of Comparative Examples 1 to 5.

Examples 1 to 11

Example 1

Fluorine-containing polymer D1 for layer (II), and blend polymer BA1 for layer (I-1) and layer (I-2) were prepared, and coextrusion was performed by using an apparatus equipped with two extruders, a T-die for coextrusion for bilayers, and a haul-off machine to obtain bilayer film (a) with a thickness of 67 μm. Observation of the cross-section of the film under an optical microscope found that the thickness of layer (I-1) was 55 μm and the thickness of layer (II) was 12 μm. In addition, monolayer film (b) of layer (I-2) with a thickness of 20 μm was obtained by using a T-day for monolayers.

A thread-like product obtained by twisting 100-denier tape yarn made of polytetrafluoroethylene (PTFE) at 900 twists/m for a core material, a product obtained by twisting 30-denier, 6-filament polyethylene terephthalate (PET) at 200 twists/m for warp of an auxiliary fiber (sacrifice yarn), and a product obtained by twisting 35-denier, 8-filament PET thread at 10 twists/m for weft of the auxiliary fiber (sacrifice yarn) were prepared, and these threads were plain-woven with such an alternate arrangement that the PTFE thread was arranged at 24 counts/inch and the sacrifice yarn was arranged at 64 counts/inch, four times the counts per inch of the PTFE, to obtain a woven fabric with a thickness of 100 μm. The woven fabric obtained was pressure-bonded with heated metal rolls to adjust the thickness of the woven fabric to 70 μm. At this time, the aperture ratio with only the PTFE thread was 75%.

The elongations of the core material prepared in MD and TD at 30 N were measured (before energization), and both were found to be 7.5 GL %. In measurement of the strength/elongation of the core material, a test piece with a sample width of 1 cm in MD and a length of 14 cm in TD was cut out of the core material, and subjected to measurement using a TENSILON (RTC-1250A manufactured by ORIENTEC CORPORATION). Specifically, the test piece was chucked with chucks each having a length of 14 cm at both ends at a chuck-to-chuck distance of 5 cm, and the elongation at a load of 30 N was measured through tensile test by elongating at 23° C. at a speed of 100 mm/min.

On a drum including a heat source and a vacuum source in the inside and having many micropores in the surface, an embossed sheet of thermally resistant release paper with air permeability, monolayer film (b), the core material, and bilayer film (a) were laminated in the order presented, and integrated while each intermaterial air was excluded under a reduced pressure of −650 mmHg at a drum surface temperature of 230° C., providing a composite membrane.

This composite membrane was saponified by soaking in an aqueous solution containing 30% by mass of dimethyl sulfoxide (DMSO) and 15% by mass of potassium hydroxide (KOH) at 80° C. for 1 hour. Thereafter, the composite membrane was soaked in an aqueous solution containing 0.5N sodium hydroxide (NaOH) at 50° C. for 1 hour to substitute the counterion of the ion-exchange group with Na, and subsequently washed with water. Further, the composite membrane was dried at 60° C. Thereafter, the membrane surface was polished under such settings that the running tension was 20 kg/cm, the relative speed between the polishing roll and the membrane was 100 m/min, and the pressing depth of the polishing roll was 2 mm, and thus opening portions were formed.

In a mixed solution of water and ethanol at 50/50 in parts by mass, 20% by mass of a fluoropolymer containing a sulfonic acid group, with a total ion-exchange capacity of 1.0 m eq./g, obtained by hydrolyzing a copolymer of $CF_2=CF_2$ and $CF_2=CFOCF_2CF(CF_3)O(CF_2)_2SO_2F$ was dissolved. To this solution, 40% by mass of zirconium oxide with an average primary particle size of 1 μm was added, and homogeneously dispersed with a ball mill to afford a suspension. With this suspension, both surfaces of the ion-exchange membrane subjected to the hydrolysis and salt exchange treatment were coated by using the spraying method, and dried to form coating layers.

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 55°, indicating no curling, and the electrolysis voltage was 2.925 V, being a good result.

Example 2

The same procedure was performed as in Example 1, except that blend polymer BA2 was prepared for layer (I-1) and layer (I-2).

For the ion-exchange membrane obtained in the above manner, the water content, water content/TFE ratio, layer (I) EW/layer (II) EW, curling angle φ), and electrolysis voltage were measured as described above; results of evaluation of physical properties are shown in Table 4. The curling angle φ was 50°, indicating no curling, and the electrolysis voltage was 2.941 V, being a good result.

Example 3

The same procedure was performed as in Example 1, except that blend polymer BA3 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 50°, indicating no curling, and the electrolysis voltage was 2.945 V, being a good result.

Example 4

The same procedure was performed as in Example 1, except that blend polymer BA4 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 86°, indicating no curling, and the electrolysis voltage was 2.935 V, being a good result.

Example 5

The same procedure was performed as in Example 1, except that blend polymer BA5 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 87°, indicating no curling, and the electrolysis voltage was 2.902 V, being a good result.

Example 6

The same procedure was performed as in Example 1, except that blend polymer BA6 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 57°, indicating no curling, and the electrolysis voltage was 2.931 V, being a good result.

Example 7

The same procedure was performed as in Example 1, except that fluorine-containing polymer D2 was prepared for layer (II).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 85°, indicating no curling, and the electrolysis voltage was 2.941 V, being a good result.

Example 8

The same procedure was performed as in Example 1, except that fluorine-containing polymer D3 was prepared for layer (II).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 45°, indicating no curling, and the electrolysis voltage was 2.915 V, being a good result.

Example 9

The same procedure was performed as in Example 1, except that blend polymer BA1 was prepared for layer (I-1) and blend polymer BA2 was prepared for layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 54°, indicating no curling, and the electrolysis voltage was 2.930 V, being a good result.

Example 10

The same procedure was performed as in Example 1, except that blend polymer BA1 was prepared for layer (I-1) and fluorine-containing polymer B4 was prepared for layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 51°, indicating no curling, and the electrolysis voltage was 2.940 V, being a good result.

Example 11

The same procedure was performed as in Example 1, except that fluorine-containing polymer B4 was prepared for layer (I-1) and blend polymer BA1 was prepared for layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 53°, indicating no curling, and the electrolysis voltage was 2.945 V, being a good result.

Example 12

The same procedure was performed as in Example 1, except that on the drum, an embossed sheet of thermally resistant release paper with air permeability, monolayer film (b), and bilayer film (a) were laminated in the order presented, and integrated, with use of no core material, while each intermaterial air was excluded under a reduced pressure of −650 mmHg at a drum surface temperature of 230° C., providing a composite membrane.

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 83°, indicating no curling, and the electrolysis voltage was 2.873 V, being a good result.

Example 13

The same procedure was performed as in Example 1, except that fluorine-containing polymer C1 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 49°, indicating no curling, and the electrolysis voltage was 2.941 V, being a good result.

Comparative Examples 1 to 5

Comparative Example 1

The same procedure was performed as in Example 1, except that blend polymer BB1 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 230°, indicating the occurrence of curling. The electrolysis voltage was 2.901 V, being a good result.

Comparative Example 2

The same procedure was performed as in Example 1, except that blend polymer BB2 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 110°, indicating the occurrence of curling. The electrolysis voltage was 2.920 V, being a good result.

Comparative Example 3

The same procedure was performed as in Example 1, except that blend polymer BB3 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 45°, indicating no curling, but the electrolysis voltage was 2.955 V, being a poor result.

Comparative Example 4

The same procedure was performed as in Example 1, except that fluorine-containing polymer B3 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 160°, indicating the occurrence of curling. The electrolysis voltage was 2.925 V, being a good result.

Comparative Example 5

The same procedure was performed as in Example 1, except that fluorine-containing polymer B4 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 47°, indicating no curling, but the electrolysis voltage was 2.950 V, being a poor result.

Comparative Example 6

The same procedure was performed as in Example 1, except that fluorine-containing polymer B6 was prepared for layer (I-1) and layer (I-2).

For the ion-exchange membrane obtained in the above manner, the water content, water content/TFE ratio, layer (I) EW/layer (II) EW, curling angle φ, and electrolysis voltage were measured as described above; results of evaluation of physical properties are shown in Table 4. The curling angle φ was 115°, indicating the occurrence of curling. The electrolysis voltage was 2.935 V, being a good result.

TABLE 4

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Layer (I-1) | BA1 | BA2 | BA3 | BA4 | BA5 | BA6 | BA1 | BA1 | BA1 | BA1 | B4 |
| Water content (%) | 30.5 | 27.2 | 27.5 | 33.1 | 34.8 | 29.4 | 30.5 | 30.5 | 30.5 | 30.5 | 25.5 |
| Water content/TFE ratio | 0.53 | 0.48 | 0.50 | 0.60 | 0.58 | 0.53 | 0.53 | 0.53 | 0.48 | 0.53 | 0.48 |
| Layer (I-2) | BA1 | BA2 | BA3 | BA4 | BA5 | BA6 | BA1 | BA1 | BA2 | B4 | BA1 |
| Water content (%) | 30.5 | 27.2 | 27.5 | 33.1 | 34.8 | 29.4 | 30.5 | 30.5 | 27.2 | 25.5 | 30.5 |
| Water content/TFE ratio | 0.53 | 0.48 | 0.50 | 0.60 | 0.58 | 0.53 | 0.53 | 0.53 | 0.48 | 0.48 | 0.53 |
| Layer (I) average water content | 30.5 | 27.2 | 27.5 | 33.1 | 34.8 | 29.4 | 30.5 | 30.5 | 29.6 | 29.1 | 26.8 |
| Layer (I) average EW | 813 | 869 | 902 | 873 | 720 | 858 | 813 | 813 | 827 | 846 | 909 |
| Layer (I) average TFE | 57.9 | 56.6 | 54.7 | 54.8 | 60.0 | 56.0 | 57.9 | 57.9 | 57.5 | 56.8 | 54.7 |
| Layer (II) | D1 | D1 | D1 | D1 | D1 | D1 | D2 | D3 | D1 | D1 | D1 |
| Water content (%) | 15.1 | 15.1 | 15.1 | 15.1 | 15.1 | 15.1 | 14.5 | 15.5 | 15.1 | 15.1 | 15.1 |
| Layer (I) − layer (II) water content (%) | 15.4 | 12.1 | 12.4 | 18.0 | 19.7 | 14.3 | 16.0 | 15.0 | 14.5 | 14.0 | 11.7 |
| Layer (I) EW/layer (II) EW | 0.71 | 0.76 | 0.78 | 0.76 | 0.63 | 0.75 | 0.69 | 0.72 | 0.72 | 0.74 | 0.79 |

TABLE 4-continued

| | | | | | | | | | | |
|---|---|---|---|---|---|---|---|---|---|---|
| Water content/TFE ratio | 0.53 | 0.48 | 0.50 | 0.60 | 0.58 | 0.53 | 0.53 | 0.53 | 0.51 | 0.51 | 0.49 |
| Curling φ (°) | 55 | 50 | 50 | 86 | 87 | 57 | 85 | 45 | 54 | 51 | 53 |
| Voltage (V) | 2.925 | 2.941 | 2.945 | 2.935 | 2.902 | 2.931 | 2.941 | 2.915 | 2.930 | 2.940 | 2.945 |

| | Example 12 | Example 13 | Comparative Example 1 | Comparative Example 2 | Comparative Example 3 | Comparative Example 4 | Comparative Example 5 | Comparative Example 6 |
|---|---|---|---|---|---|---|---|---|
| Layer (I-1) | BA1 | C1 | BB1 | BB2 | BB3 | B3 | B4 | B6 |
| Water content (%) | 30.5 | 26.8 | 40.3 | 36.0 | 24.0 | 33.6 | 25.5 | 28.1 |
| Water content/TFE ratio | 0.53 | 0.48 | 0.69 | 0.69 | 0.44 | 0.66 | 0.48 | 0.54 |
| Layer (I-2) | BA1 | C1 | BB1 | BB2 | BB3 | B3 | B4 | B7 |
| Water content (%) | 30.5 | 26.8 | 40.3 | 36.0 | 24.0 | 33.6 | 25.5 | 28.1 |
| Water content/TFE ratio | 0.53 | 0.48 | 0.69 | 0.69 | 0.44 | 0.66 | 0.48 | 0.54 |
| Layer (I) average water content | 30.5 | 26.8 | 40.3 | 36.0 | 24.0 | 33.6 | 25.5 | 28.1 |
| Layer (I) average EW | 813 | 870 | 722 | 875 | 934 | 909 | 950 | 920 |
| Layer (I) average TFE | 57.9 | 56.2 | 58.2 | 52.0 | 55.1 | 51.3 | 53.4 | 51.9 |
| Layer (II) | D1 | D1 | D1 | D1 | D1 | D1 | D1 | D1 |
| Water content (%) | 15.1 | 15.1 | 15.1 | 15.1 | 15.1 | 15.1 | 15.1 | 15.1 |
| Layer (I) – layer (II) water content (%) | 15.4 | 11.7 | 25.2 | 20.9 | 8.9 | 18.5 | 10.4 | 13.0 |
| Layer (I) EW/layer (II) EW | 0.71 | 0.76 | 0.63 | 0.76 | 0.81 | 0.79 | 0.83 | 0.80 |
| Water content/TFE ratio | 0.53 | 0.48 | 0.69 | 0.69 | 0.44 | 0.65 | 0.48 | 0.54 |
| Curling φ (°) | 83 | 49 | 230 | 110 | 45 | 160 | 47 | 115 |
| Voltage (V) | 2.873 | 2.941 | 2.901 | 2.920 | 2.955 | 2.925 | 2.950 | 2.935 |

The present application is based on Japanese patent application filed on Nov. 12, 2018 (Japanese Patent Application No. 2018-212504), and the contents are incorporated herein by reference.

INDUSTRIAL APPLICABILITY

The cation-exchange membrane in the present invention can be used, for example, for fuel cells, water electrolysis, steam electrolysis, and chloro-alkali electrolysis. In particular, the cation-exchange membrane in the present invention can be preferably applied to chloro-alkali electrolysis.

REFERENCE SINGS LIST 1 ion-exchange membrane
2a continuous hole
2b continuous hole
3 reinforced core material
4 layer A
5 layer B
6 coating layer
7 coating layer
8 portion of layer A facing anode-side surface
α anode side of electrolyzer
β cathode side of electrolyzer
11 anode
12 cathode
13 electrolyzer

The invention claimed is:

1. A cation-exchange membrane comprising:
a layer (I) comprising repeating units (A) each represented by formula (1) and repeating units (S) each containing a sulfonic acid-type ion-exchange group; and
a layer (II) comprising a fluorine-containing polymer comprising a carboxylic acid-type ion-exchange group and disposed on the layer (I),
wherein
the repeating units (S) comprises repeating units (C) each represented by formula (3) and repeating units (D) each represented by formula (4), and
a water content of layer (I) is 25% 25 wt. % or more and 35% 35 wt. % or less:

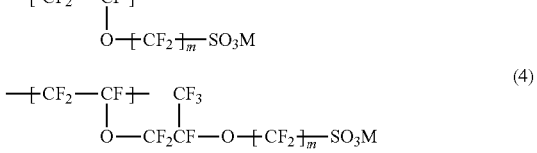

wherein,
in formulas (3) and (4), m each independently represents an integer of 1 to 12, and M represents an alkali metal; and
the layer (I) comprises a mixture of a copolymer comprising the repeating units (A) and the repeating units (C) and a copolymer comprising the repeating units (A) and the repeating units (D).

2. The cation-exchange membrane according to claim 1, further comprising a core material disposed in an inside of the layer (I) or between the layer (I) and the layer (II).

3. A cation-exchange membrane comprising:
a layer (I) comprising repeating units (A) each represented by formula (1) and repeating units (S) each comprising a sulfonic acid-type ion-exchange group, wherein a mass proportion of the repeating units (A) based on a total mass proportion of the repeating units (A) and the repeating units (S) being 100% by mass is 53% by mass or more and 70% by mass or less; and
a layer (II) comprising a fluorine-containing polymer comprising a carboxylic acid-type ion-exchange group and disposed on the layer (I),
wherein a water content of the layer (I) is 26 wt. % or more and 35 wt. % or less:

wherein
the repeating units (S) comprises repeating units (B) each represented by formula (2):

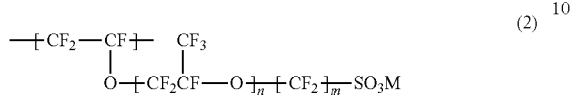

wherein, in formula (2), n represents an integer of 0 to 3, m represents an integer of 1 to 12, and M represents an alkali metal;
the repeating units (B) comprises repeating units (C) each represented by formula (3) and repeating units (D) each represented by formula (4):

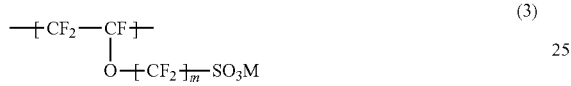

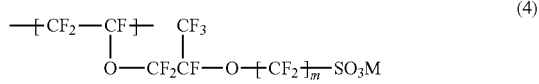

wherein, in formulas (3) and (4), m and M are as defined in formula (2); and
the layer (I) comprises a mixture of a copolymer comprising the repeating units (A) and the repeating units (C) and a copolymer comprising the repeating units (A) and the repeating units (D).

4. The cation-exchange membrane according to claim 3, wherein, based on a total mass proportion of the repeating units (A), the repeating units (C) and the repeating units (D) being 100% by mass in the layer (I), a mass proportion of the repeating units (A) is 53% by mass or more and 70% by mass or less, a mass proportion of the repeating units (C) is 3% by mass or more and 44% by mass or less, and a mass proportion of the repeating units (D) is 3% by mass or more and 44% by mass or less.

5. The cation-exchange membrane according to claim 3, wherein a difference in water content between the layer (I) and the layer (II) is 25 wt. % or less.

6. The cation-exchange membrane according to claim 3, further comprising a core material disposed in an inside of the layer (I) or between the layer (I) and the layer (II).

7. The cation-exchange membrane according to claim 6, wherein the core material is a woven fabric of a fiber comprising a fluorine polymer.

8. The cation-exchange membrane according to claim 6, comprising a laminate structure consisting of the layer (I) and the layer (II),
wherein the core material is disposed in an inside of the layer (I).

9. The cation-exchange membrane according to claim 3, wherein the layer (I) comprises a copolymer comprising the repeating units (A), the repeating units (C), and the repeating units (D).

10. The cation-exchange membrane according to claim 3, wherein a value obtained by dividing an equivalent weight of the layer (I) by an equivalent weight of the layer (II) is 0.6 or more and 0.8 or less.

11. The cation-exchange membrane according to claim 3, wherein, in layer (I), a value obtained by dividing the water content by mass by the mass proportion of the repeating units (A) based on the total mass proportion of the repeating units (A) and the repeating units (S) being 100% by mass is 0.48 or more and 0.64 or less.

12. The cation-exchange membrane according to claim 3, wherein the layer (I) has a laminate structure consisting of: a layer (I-1) comprising a copolymer comprising the repeating units (A) and the repeating units (D); and a layer different from the layer (I-1).

13. The cation-exchange membrane according to claim 3, wherein the layer (I) has a laminate structure consisting of: a layer (I-2) comprising a copolymer comprising the repeating units (A) and the repeating units (C); and a layer different from the layer (I-2).

14. The cation-exchange membrane according to claim 3, wherein the fluorine-containing polymer comprising the carboxylic acid-type ion-exchange group comprises:
the repeating units (A) and
repeating units (E) each represented by formula (5):

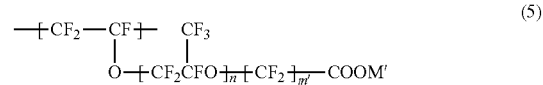

wherein, in formula (5), n represents an integer of 0 or 1, m' represents an integer of 1 to 12, and M' represents an alkali metal.

15. The cation-exchange membrane according to claim 3, wherein the cation-exchange membrane can be used for chloro-alkali electrolysis.

16. An electrolyzer comprising:
an anode;
a cathode; and
the cation-exchange membrane according to claim 3 disposed between the anode and the cathode.

17. The electrolyzer according to claim 16, wherein the layer (II) is disposed to face the cathode.

* * * * *

UNITED STATES PATENT AND TRADEMARK OFFICE
CERTIFICATE OF CORRECTION

PATENT NO. : 12,053,770 B2  
APPLICATION NO. : 17/275440  
DATED : August 6, 2024  
INVENTOR(S) : K. Nakagawa et al.

Page 1 of 1

It is certified that error appears in the above-identified patent and that said Letters Patent is hereby corrected as shown below:

On the Title Page

Item (57) abstract (Line 12), please change "(1)" to -- (1). --.

In the Claims

Column 40, Line 31 (Claim 1, Line 13), please change "25% 25 wt. %" to -- 26 wt. % --.

Column 40, Line 32 (Claim 1, Line 14), please change "35% 35 wt. %" to -- 35 wt. % --.

Signed and Sealed this  
Nineteenth Day of August, 2025

Coke Morgan Stewart  
*Acting Director of the United States Patent and Trademark Office*